US012443721B2

(12) United States Patent
Jadhav et al.

(10) Patent No.: US 12,443,721 B2
(45) Date of Patent: Oct. 14, 2025

(54) MEDICAL DEVICE CYBERSECURITY PLATFORM

(71) Applicant: VIGILANT OPS, INC., Pittsburgh, PA (US)

(72) Inventors: Manish Jadhav, McMurray, PA (US); Kenneth Zalevsky, Pittsburgh, PA (US)

(73) Assignee: Vigilant Ops, Inc., Pittsburgh, PA (US)

( * ) Notice: Subject to any disclaimer, the term of this patent is extended or adjusted under 35 U.S.C. 154(b) by 222 days.

(21) Appl. No.: 17/924,743

(22) PCT Filed: May 11, 2021

(86) PCT No.: PCT/US2021/031775
§ 371 (c)(1),
(2) Date: Nov. 11, 2022

(87) PCT Pub. No.: WO2021/231423
PCT Pub. Date: Nov. 18, 2021

(65) Prior Publication Data
US 2023/0244791 A1    Aug. 3, 2023

Related U.S. Application Data

(60) Provisional application No. 63/022,938, filed on May 11, 2020.

(51) Int. Cl.
G06F 21/57    (2013.01)
G06F 8/65    (2018.01)
G16H 40/40    (2018.01)

(52) U.S. Cl.
CPC .............. *G06F 21/577* (2013.01); *G06F 8/65* (2013.01); *G16H 40/40* (2018.01); *G06F 2221/034* (2013.01)

(58) Field of Classification Search
CPC ...................................................... G06F 21/577
See application file for complete search history.

(56) References Cited

U.S. PATENT DOCUMENTS

| | | | |
|---|---|---|---|
| 8,051,414 B2 * | 11/2011 | Stender | G16H 40/40 717/168 |
| 9,749,349 B1 * | 8/2017 | Czarny | H04L 63/1425 |
| 10,089,473 B2 * | 10/2018 | Mahrous | G06Q 50/00 |
| 11,636,198 B1 * | 4/2023 | Kulkarni | G06F 21/564 726/22 |

(Continued)

OTHER PUBLICATIONS

Stockhausen et al. "Continuous security patch delivery and risk management for medical devices" Mar. 16, 2020, 2020 IEEE International Conference on Software Architecture Companion (ICSA-C), IEEE, 204-209 (6 pages).

*Primary Examiner* — Simon P Kanaan
(74) *Attorney, Agent, or Firm* — DLA Piper LLP

(57) ABSTRACT

Systems and methods for the management of cybersecurity risks for medical devices are disclosed. A system may streamline and automate the process of generating a cybersecurity bill of materials and evaluate it against the National Vulnerability Database or a similar source. Furthermore, the system may provide a secure platform for data to be transferred between medical device manufacturers and healthcare delivery organizations allowing for the notification of security vulnerabilities and the transferal of security updates.

20 Claims, 27 Drawing Sheets

(56) References Cited

U.S. PATENT DOCUMENTS

| | | | |
|---|---|---|---|
| 11,783,062 B2* | 10/2023 | Lounsberry | G06F 21/6218 726/30 |
| 2007/0203547 A1* | 8/2007 | Costello | A61N 1/056 607/59 |
| 2017/0169229 A1 | 6/2017 | Brucker et al. | |
| 2018/0351987 A1* | 12/2018 | Patel | G06F 21/577 |
| 2019/0114435 A1* | 4/2019 | Bhalla | G06F 21/55 |
| 2020/0201620 A1* | 6/2020 | Beard | G06F 8/61 |

\* cited by examiner

```
{
  "name": "MR Injector",
  "description":"",
  "deviceId":3,
  "model":"Delta",
  "version":"4.6",
  "dateCreated":"2020-01-10T16:43:15.239147",
  "status":0,
  "operatingSystem":{
      "id":0,
      "operatingSystemName":"Windows 10 Pro",
      "version":"10.0",
      "manufacturer":"Microsoft",
      "build":"15063",
      "release":"1703",
      "architecture":"x64"
  },
  "components":[
      {
          "componentId":0,
          "vendor":"Blender Foundation",
          "product":"Blender",
          "version":"2.79.2",
          "manualEntry":false
      },
      {
          "componentId":0,
          "vendor":"Dolby Laboratories, Inc.",
          "product":"Dolby Audio X2 Windows APK SDK",
          "version":"0.8.0.74",
          "manualEntry":false
      }
  ]
}
```

FIG. 4

Review Cybersecurity Bill of Materials

Verify that this is the CBOM we want to upload

Doesn't look right? Click here to upload a different CBOM.

Device Name
MR Injector

Model
Delta

Version
4.6

Operating System
Windows 10 Pro

Device Description

Date Generated: 24 Jan 2020

| Software | Name | Version | Component | CPE |
|---|---|---|---|---|
| Blender Foundation | Blender | 2.79.2 | Discovered | |
| Dolby Laboratories, Inc. | Dolby Audio X2 Windows API SDK | 0.8.0.74 | Discovered | |
| Notepad++ Team | Notepad++ (64-bit x64) | 7.7 | Discovered | |
| Microsoft Corporation | Microsoft Visual J# 2.0 Redistributable Package - SE (x64) | 2.0.50728 | Discovered | |
| Microsoft Corporation | Microsoft Visual C++ 2015 x64 Minimum Runtime - 14.0.24212 | 14.0.24212 | Discovered | |
| Microsoft Corporation | Microsoft Visual C++ 2013 x64 Minimum Runtime - 12.0.40660 | 12.0.40660 | Discovered | |

ALL (4)   PUBLISHED (0)   UNPUBLISHED (4)

ADD DEVICE GROUP ⊕

Upload the selected CBOM

UPLOAD CBOM ⇧ — 501

MDM Admin adds a new user and assigns CBOM Review and Approval privileges

Add User

First Name: Steve — 801
Last Name: Rogers — 802
Email: Steve.Rogers@shield.gov — 803

Choose User Privileges — 804

CBOMs
☐ Upload
☑ Review & Comment
☑ Approve
☐ Publish / Unpublish / Archive

HDOs
☐ Invite / Manage

Users
☐ Add / Manage

CANCEL    SAVE

VIGILANTOPS | InSIGHT  Dashboard  CBOMs  HDOs  Users

To-Do List

ALL (6)  SUBMITTED (1)  IN PROGRESS (1)

| Device Name | Model | Version | Received Date | MDM | Total Components | % Reviewed | Status |
|---|---|---|---|---|---|---|---|
| Capture RTC | CAP-RTC | 2.0.5 | 01 Aug 2019 | Phillips | 6 | 66% | In Progress |
| EQ Optimum 100 | EQO-100 | 1.1.6 | 07 Aug 2019 | Phillips | 320 | 65% | In Progress |
| EQ Optimum 200 | EQO-200 | 1.5.4 | 08 July 2019 | Bayer | 70 | 90% | Submitted |
| Resolution Prime | RES-PR1 | 12.0 | 20 June 2018 | Phillips | 17 | 95% | In Progress |
| Transcender LT | TRN-SLT | 12.0 | 22 April 2018 | Phillips | 600 | 95% | Submitted |

Below are the most recent CPEs available for review

| Vendor | Product | Version | Date Last Reviewed | Total # of CBOMs | Current Match |
|---|---|---|---|---|---|
| Adobe | Adobe Flash Player 32 PPAPI | 32.0.0.101 | 08 Sep 2019 | 100 | No Match |
| Google | Google Chrome | 71.0.3578.98 | 07 Sep 2019 | 34 | No Match |
| Google | Google Update Helper | 1.3.33.17 | 08 Sep 2019 | 100 | No Match |
| Oracle | Java 8 Update 191 | 8.0.1910.12 | 06 May 2018 | 57 | Good Enough |
| McAfee | McAfee Security Scan Plus | 3.11.895.1 | 07 April 2018 | 43 | Good Enough |
| Microsoft | Silverlight | 5.1.1.25 | 07 April 2018 | 30 | No Match |

FIG. 12

Manual Component to CPE Matching

| Vendor | Product | Version |
|---|---|---|
| Microsoft | Microsoft Visual c2010> | 6.1.0.0 |

Showing 20-40 of 200 Results  « »

| Select | Score | Product |
|---|---|---|
| ▲ | 0.9718 | Microsoft Visual c2010 x86 redistributable |

1331 → (▲ row above)
1332 → Select CPE Matching Confidence
○ Certified Match    ○ Good Enough Match

| Select | Score | Product |
|---|---|---|
| ▽ | 0.8175 | Microsoft Windows performance toolkit |
| ▽ | 0.8168 | Micrsoft visual j# 2.0 redistributable package |
| ▽ | 0.8145 | Micrsoft visual c2008 redistributable x86 |
| ▽ | 0.7640 | Micrsoft Corporation c2005 redistributable x86 |
| ▽ | 0.76 | Micrsoft Visual c2010 x86 redistributable |
| ▽ | 0.7546 | Axeda deployment |
| ▽ | 0.7535 | Axeda desktop server |
| ▽ | 0.7501 | Virtualcare application for stellant ii version 3.0.0 |
| ▽ | 0.6943 | Virtualcaremonitorservice |
| ▽ | 0.684 | Ni ethernet device enumerator |
| ▽ | 0.671 | Ni trace engine, Version |
| ▽ | 0.67 | Ni timing installer 2.2.5 |
| ▽ | 0.669 | Ni-mxdf 1.115f1 |
| ▽ | 0.660 | Ni-mx expert framework 2.6.1 |
| ▽ | 0.541 | Ni-mru 2.11.1f0 |
| ▽ | 0.321 | Ni-dim 1.11.0f0 |
| ▽ | 0.320 | Ni-daqmx switch core 2.1.0 |
| ▽ | 0.32 | Ni-daqmx 9.2.2 |
| ▽ | 0.298 | Ni-daq inf files 19.2.2 |
| ○ | | NO CPE MATCH |

1330 (table), 1333 → NO CPE MATCH

FIG. 13

| Reviewed Date | State |
|---|---|
| 08 Sep 2019 | Review Needed |

( REVIEW PREVIOUS )   ( REVIEW NEXT )

Selection Criteria  [ Standard Selection Criteria ▽ ]

| Vendor | Version |
|---|---|
| Microsoft Corporation | 6.1.0.0 |

( CLEAR )   ( SAVE )

| Vendor | Version |
|---|---|
| Microsoft Corporation | 4.1.0.2001 |
| Microsoft Corporation | 3.2.1.7654.b40 |
| Microsoft Corporation | 9.20 |
| Microsoft Corporation | 6.1.603.0 |
| Microsoft Corporation | 6.1.0.0 |
| Axeda Corporation | 6.1.0.0 |
| Axeda Corporation | 6.1.603.0 |
| Bayer Healthcare | 3.0.0 |
| Bayer Healthcare | 3.1.0.37 |
| National Instruments | 1.00.49152 |
| National Instruments | 4.1.0.2001 |
| National Instruments | 2.25.49152 |
| National Instruments | 9.20 |
| National Instruments | 6.1.603.0 |
| National Instruments | 6.1.0.0 |
| National Instruments | 4.1.0.2001 |
| National Instruments | 3.2.1.7654.b40 |
| National Instruments | 9.20 |
| National Instruments | 6.1.603.0 |

INSIGHT
For Healthcare Delivery Organizations

Jane Doe

MDMs

[All] 🔍 ⊗ ⚐

- Acorn Laboratories ⊗
- Bethel Technologies ⊗
- Clairton Health ⊗
- Doone & Doone ⊗
- Fullerton Healthcare ⊗
- ▲ GTL Corporation
  Connected 26 Sep 2019   CLICK TO VIEW MDM PROFILE
  ⇄ CardioStart XL
  ⇄ DiagnoXS
  ⇄ EKGeo V
  ⇄ Milner S1

CBOMs

HDO can view pinned CBOMs in List View, in addition to previous Grid View ( ALL | PINNED )    🔍           ▦ ▤
                                CLICK FOR

| Device Name ◆ | Model ◆ | Version | Date Created ◆ | CBOM Status |
|---|---|---|---|---|
| CardioStart XL | GTL Corporation CardioStart XL V.1.2.0 Published 24 Sep 2019 (2) Vulnerabilities found. | 1.2.0 | 25 Sep 2019 | Active |
| EKGeo V | | 1.4.0 | 25 Sep 2019 | Active |
| Milner S1 | | 2.0.1 | 25 Sep 2019 | Active |
| TitanMax EU | | 1.0.5 | 25 Sep 2019 | Active |

FIG. 17

HDO view of CBOM as a Basic subscriber

DASHBOARD

CardioStart XL

——1801——

| Device Name | Model | Version | CBOM Status |
|---|---|---|---|
| CardioStart XL | CDS-XL1 | 1.2.0 | Active |

Device Description
This easy-to-use, clinically proven SPECT system provides diagnostic image quality and reliability, as well as access to the latest nuclear medicine processing and review applications. Specifically designed for nuclear cardiology, the Phillips CardioMD IV is a clinically-proven SPECT system tailored to enhance your workflow and add value to your practice.

| Software ⇔ | Name | Version |
|---|---|---|
| ⌄ Adobe | Silverlight | 5.1.1.25 |
| Google | Google Chrome | 71.0.3578.98 |
| Google | Silverlight | |
| Oracle | Java 8 Update 191 | 8.0.1910.12 |
| Mcafee | Silverlight | 5.1.1.25 |
| ⌄ Microsoft | Silverlight | 5.1.1.25 |

FIG. 18
CONTINUED as access to the latest nuclear medicine processing and review applications. Specifically designed for nuclear cardiology, the Phillips CardioMD IV is a clinically-proven SPECT system tailored to enhance your workflow and add value to your practice.

HDO view of CBOM as a Premium subscriber

| Software | Name | Version | Component | CPE |
|---|---|---|---|---|
| ▽ Adobe | Silverlight | 5.1.1.25 | Discovered | 🔄 |
| Google | Google Chrome | 71.0.3578.98 | Discovered | 🔄 |
| Google | Silverlight | 5.1.1.25 | Discovered | 🔄 |

FIG. 19

| | | | |
|---|---|---|---|
| Oracle | Java 8 Update 191 | 8.0.1910.12 | Discovered |
| Mcafee | Silverlight | 5.1.1.25 | Discovered |
| ▽ Microsoft —1901 | Silverlight | 5.1.1.25 | Manually Added |

CVE-2017-0283 —1903  CLICK FOR MORE DETAILED CBOM VIEW

Uniscribe in Windows Server 2008 SP2 and R2 SP1, Windows 7 SP1, Windows 8.1, Windows Server 2012 Gold and R2, Windows RT 8.1, Windows 10 Gold, 1511, 1607, Windows Server 2016, Microsoft Office 2007 SP3, Microsoft Office 2010 SP2, Microsoft Office Word Viewer, Microsoft Lync 2013 SP1, Skype for Business 2016, Microsoft Silverlight 5 Developer Runtime when installed on Microsoft Windows, and Microsoft Silverlight 5 when installed on Microsoft Windows allows a remote code execution vulnerability due to the way it handles objects in memory, aka "Windows Uniscribe Remote Code Execution Vulnerability". This CVE ID is unique from CVE-2017-8528. 1902   View more details

CLICK FOR MORE DETAILED CBOM VIEW —1903

FIG. 19
CONTINUED

MEDICAL DEVICE CYBERSECURITY PLATFORM

CROSS-REFERENCE TO RELATED APPLICATIONS

This application is a U.S. national stage filing under 35 U.S.C. § 371 of International Patent Application PCT/US2021/031775, filed May 11, 2021, which claims the priority benefit of U.S. Provisional Patent Application No. 63/022,938, filed May 11, 2020 and entitled "Medical Device Cybersecurity Platform," the entirety of each is incorporated herein by reference.

BACKGROUND

The U.S. Food and Drug Administration (FDA) published an updated draft of Premarket Cybersecurity Guidance on October 2018. As part of the updates, the FDA introduced the concept of a cybersecurity bill of materials (CBOM) for medical devices. CBOM(s) are intended to be created by medical device manufacturers (MDMs) for devices that are designed for use by healthcare providers, hospitals, medical centers, and other healthcare delivery organizations (HDOs). A CBOM may include a list of software and hardware components (e.g., proprietary and open source), along with their respective version numbers (if available).

When dealing with medical devices, which may contain protected health information (PHI), it is important to track and monitor the supply chain and development of both hardware and software as part of an overall risk assessment strategy. Numerous potential risks exist, such as, for example, hardware manufacturers modifying or manipulating electronic chips to enable backdoor access into the system, development of software exploits, lack of support for open source software, and the like. Such vulnerabilities could be leveraged for wide-scale data theft, spreading ransomware, or as a part of botnets. Furthermore, the U.S. Department of Homeland Security has categorized the Healthcare and Public Health Sector as one of sixteen critical infrastructure sectors whose assets, systems, and networks are considered vital to the United States. As such, defining a CBOM for a medical device to assist regulators, users, and MDMs with verifying and/or effectively managing critical components of the medical device would be of tremendous benefit.

In addition, HDOs can face a variety of issues resulting from device maintenance. For example, healthcare providers may be tasked with trying to maintain and manage hundreds or thousands of medical devices that are connected to their network. Moreover, traditional remote scanners can sometimes interrupt a device with a software or other update while the device is in use, which can result in patient safety concerns. Additionally, many older and/or legacy devices may not have any easy method by which to facilitate software updates. If critical patches or bug fixes cannot be delivered to such devices, the devices could become compromised and potentially pose a health risk to patients or raise a security risk on their own and/or to other devices.

Accordingly, a need exists for a system that streamlines and automates the process of generating a proper CBOM.

A further need exists for methods and systems that enable evaluation of a CBOM for vulnerabilities by continuously monitoring public data sources, such as the National Vulnerability Database (NVD).

SUMMARY

This summary is provided to comply with 37 C.F.R. § 1.73, require a summary of the invention briefly indicating the nature and substance of the invention. It is submitted with the understanding that it will not be used to interpret or limit the scope or meaning of the present disclosure.

A system for the management of cybersecurity risks for medical devices is provided. The system includes a processor, and a processor-readable storage medium containing programming instructions that, when executed, cause the processor to receive data associated with a medical device; evaluate, based on the data, an identity of the medical device; generate, based on the identification, a cybersecurity bill of materials associated with the medical device; evaluate, using a vulnerability database, the cybersecurity bill of materials to identify one or more potential vulnerabilities; provide notification of the one or more potential vulnerabilities to at least one user; determine, using a manufacturer's database, whether the medical device is up-to-date; and responsive to determining that the device is not up-to-date, receive a patch from the manufacturer's database to update the medical device.

In some embodiments, the data associated with the medical device comprises at least one of a device manufacturer, a device name, a device model, a device version, an IP address, a device domain, a device administrator, or a device password.

In some embodiments, the one or more programming instructions that, when executed, cause the processor to receive data associated with the medical device further comprise one or more programming instructions that, when executed, cause the processor to interrogate the medical device directly for data.

In some embodiments, the cybersecurity bill of materials comprises a software bill of materials and the data associated with the medical device is received directly from the medical device.

In some embodiments, the cybersecurity bill of materials comprises a software bill of materials and the data associated with the medical device is received directly from the build environment of the software.

In some embodiments, the at least one user comprises at least one of a medical device manufacturer user, a healthcare delivery organization user, or a platform maintenance user.

In some embodiments, the one or more programming instructions that, when executed, cause the processor to evaluate the cybersecurity bill of materials to identify one or more potential vulnerabilities are performed recursively and in real-time.

In some embodiments, the one or more programming instructions that, when executed, cause the processor to provide notification of the one or more potential vulnerabilities further comprise one or more programming instructions that, when executed, cause the processor to flag the one or more potential vulnerabilities on a graphical user interface.

In some embodiments, the one or more programming instructions that, when executed, cause the processor to provide notification of the one or more potential vulnerabilities further comprise one or more programming instructions that, when executed, cause the processor to message at least one user using an automated email, text, call, messaging application, or service ticket system.

In some embodiments, the one or more programming instructions that, when executed, cause the processor to evaluate the identity of the medical device further comprises one or more programming instructions that, when executed, cause the processor to map the identity of the device to a standard naming convention of a known device.

In some embodiments, patches are automatically deployed upon receipt. In some embodiments, prior to deploying the patch, a notification is transmitted to the at least one user and instructions are received. In some embodiments, patch deployment may be delayed to a pre-determined time.

BRIEF DESCRIPTION OF THE DRAWINGS

For the purpose of illustrating the invention, there is shown in the drawings various embodiments; it being understood, however, that the invention is not limited to the specific instrumentalities disclosed as they are used for illustrative purposes only. Included in the drawings are the following Figures:

FIG. 4 depicts an example of CBOM generation according to an embodiment.

FIG. 5 depicts an illustrative graphical user interface for reviewing and uploading a CBOM, in a medical device cybersecurity platform, according to an embodiment.

FIG. 7 depicts an illustrative graphical user interface for managing user roles, in a medical device cybersecurity platform, according to an embodiment.

FIG. 8 depicts an illustrative graphical user interface for adding a user and setting privileges, in a medical device cybersecurity platform, according to an embodiment.

FIG. 11 depicts an illustrative graphical user interface for a to-do list, in a medical device cybersecurity platform, according to an embodiment.

FIG. 12 depicts an illustrative graphical user interface dashboard view of a CBOM, in a medical device cybersecurity platform, according to an embodiment.

FIG. 13 depicts an illustrative graphical user interface for manual component matching, in a medical device cybersecurity platform, according to an embodiment.

FIG. 14 depicts an illustrative graphical user interface for user registration, in a medical device cybersecurity platform, according to an embodiment.

FIG. 15 depicts an illustrative graphical user interface for displaying MDMs, in a medical device cybersecurity platform, according to an embodiment.

FIG. 17 depicts another illustrative graphical user interface for displaying CBOMs, in medical device cybersecurity platform, according to an embodiment.

FIG. 19 depicts another illustrative graphical user interface for a medical device cybersecurity platform according to an embodiment.

DETAILED DESCRIPTION

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

Embodiments are discussed herein in which a CBOM may be periodically cross-referenced against the NVD or a similar vulnerability database. If the system determines that a vulnerability exists in a specific software dependency or hardware chip being used in the device, the platform can notify any required parties (e.g., the medical device manufacturer (MDM), the healthcare delivery organization (HDO), or a third party). Notification of vulnerabilities may occur in real-time.

Additionally, in some embodiments, a software bill of materials (SBOM) may be used in addition to or as a substitute for a CBOM. Thus, it should be understood that although CBOM(s) are the primary bill of materials discussed in the various illustrative embodiments set out herein, an SBOM or the like may also be utilized by the system. An SBOM may have an associated software developer.

Figure 1:
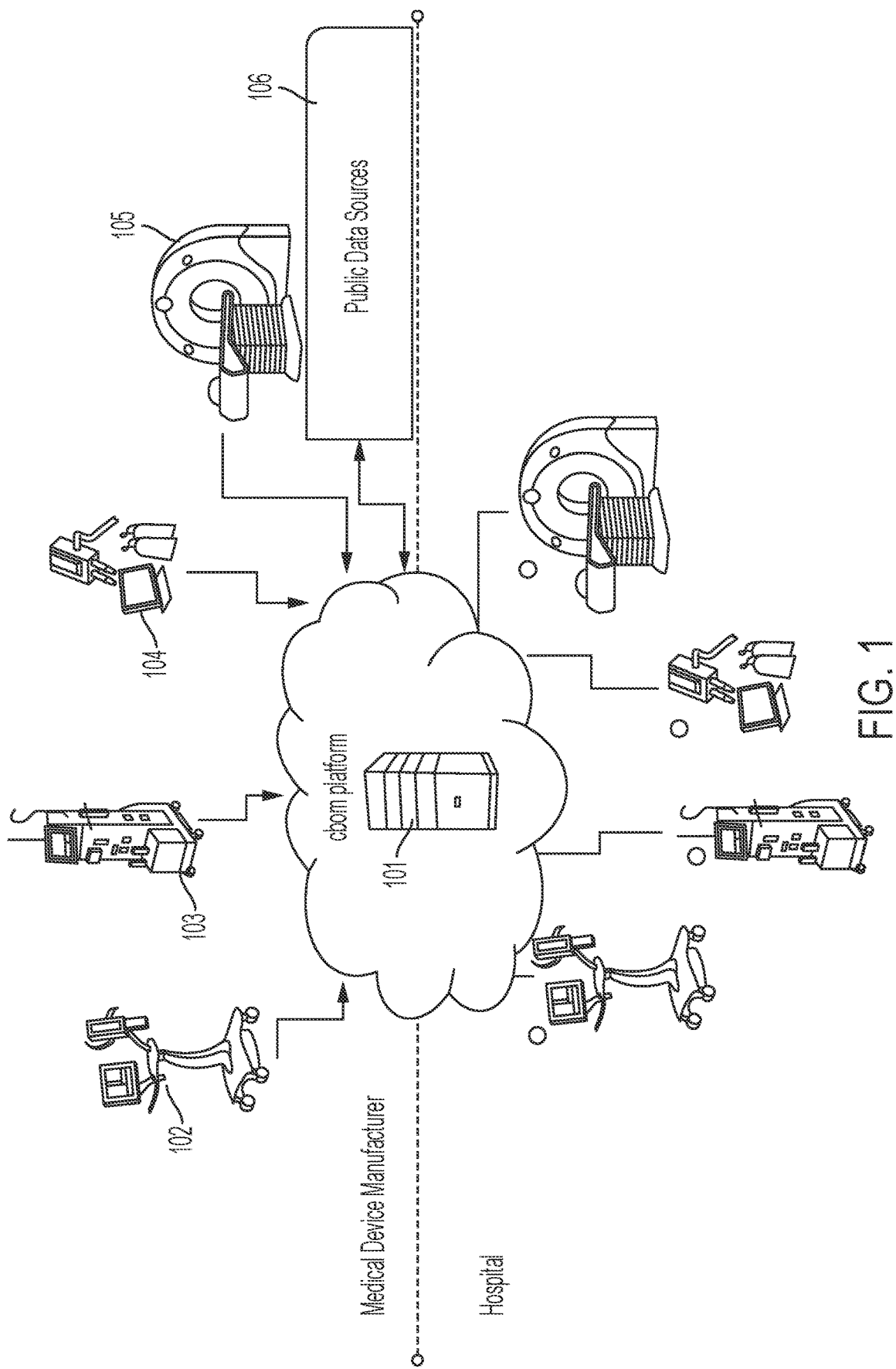
FIG. 1 depicts a medical device cybersecurity platform according to an embodiment.

Thus, embodiments are discussed herein related to systems and/or methods for management of cybersecurity risks for medical devices. In some embodiments, and as shown in FIG. 1, the system 101 may use an interrogation module to obtain a cybersecurity bill of materials (CBOM). The CBOM may include information/characteristics associated with a medical device (e.g., 102, 103, 104, and 105). In a further embodiment, the system 101 may use a common platform module to identify an evaluation equivalent for each of the plurality of characteristics based on a common platform enumeration database. The evaluation equivalent may be, for example, a name of a piece of hardware/software, a version number, an operating system, a device name, MDM information, and/or any other information relevant to a medical device. In an additional embodiment, the evaluation equivalent may include a request for further information and/or user input (i.e., to assist and/or enable the CBOM to properly create a common platform enumeration (CPE)).

In some embodiments, an entry on the CBOM may further comprise a build environment associated with a software component. The build environment may comprise software and/or hardware for developing and compiling the software component. The build environment may be evaluated as part of an associated component or interrogated as a separate entity within the CBOM.

In some embodiments, the system may use the evaluation equivalent to determine whether any of the information and characteristics are associated with a vulnerability by comparing the CPE with the NVD or other public data sources 106. The system may store the CBOM and vulnerability statistics and allow an authorized user to review/access the CBOM and vulnerability statistics via a maintenance platform. In some embodiments, MDMs may self-report vulnerabilities directly to the platform.

Figure 2:
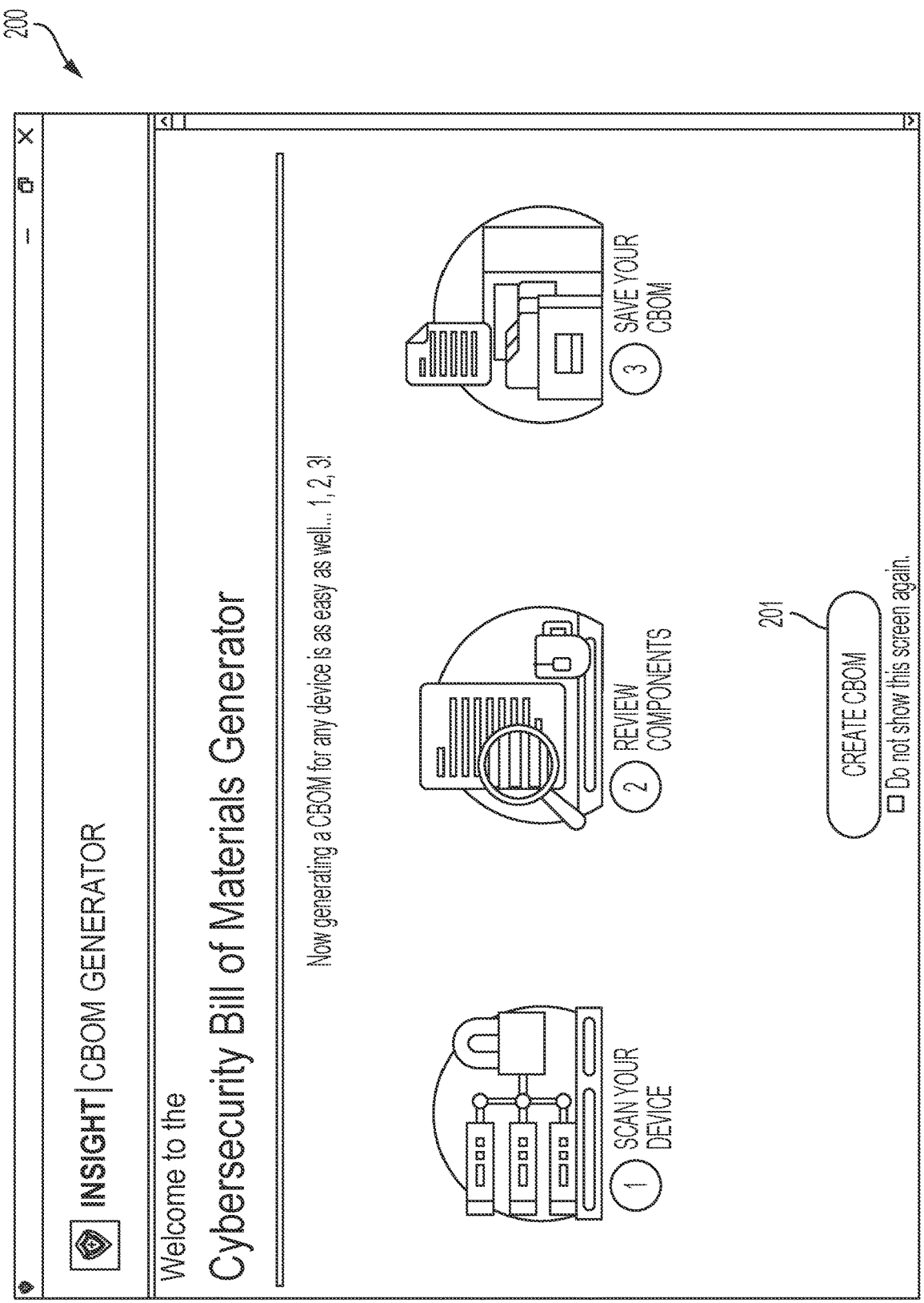
FIG. 2 depicts an illustrative graphical user interface for CBOM generation, in a medical device cybersecurity platform, according to an embodiment.

Referring now to FIG. 2, an illustrative example of a graphical user interface (GUI) 200 for a CBOM generator is shown. Once the user requests the creation of a CBOM (e.g., by selecting "Create CBOM" 201) the system may scan one or more networks for any available medical devices. If more than one medical device is available on the network, the system may, in some embodiments, generate and/or display a list of the devices for a user or additional system/software to select. In an alternative embodiment, the system may require the user to enter data corresponding to various characteristics of the medical device (e.g., device name, model, version, IP address, domain, user credentials, etc.).

Figure 3:
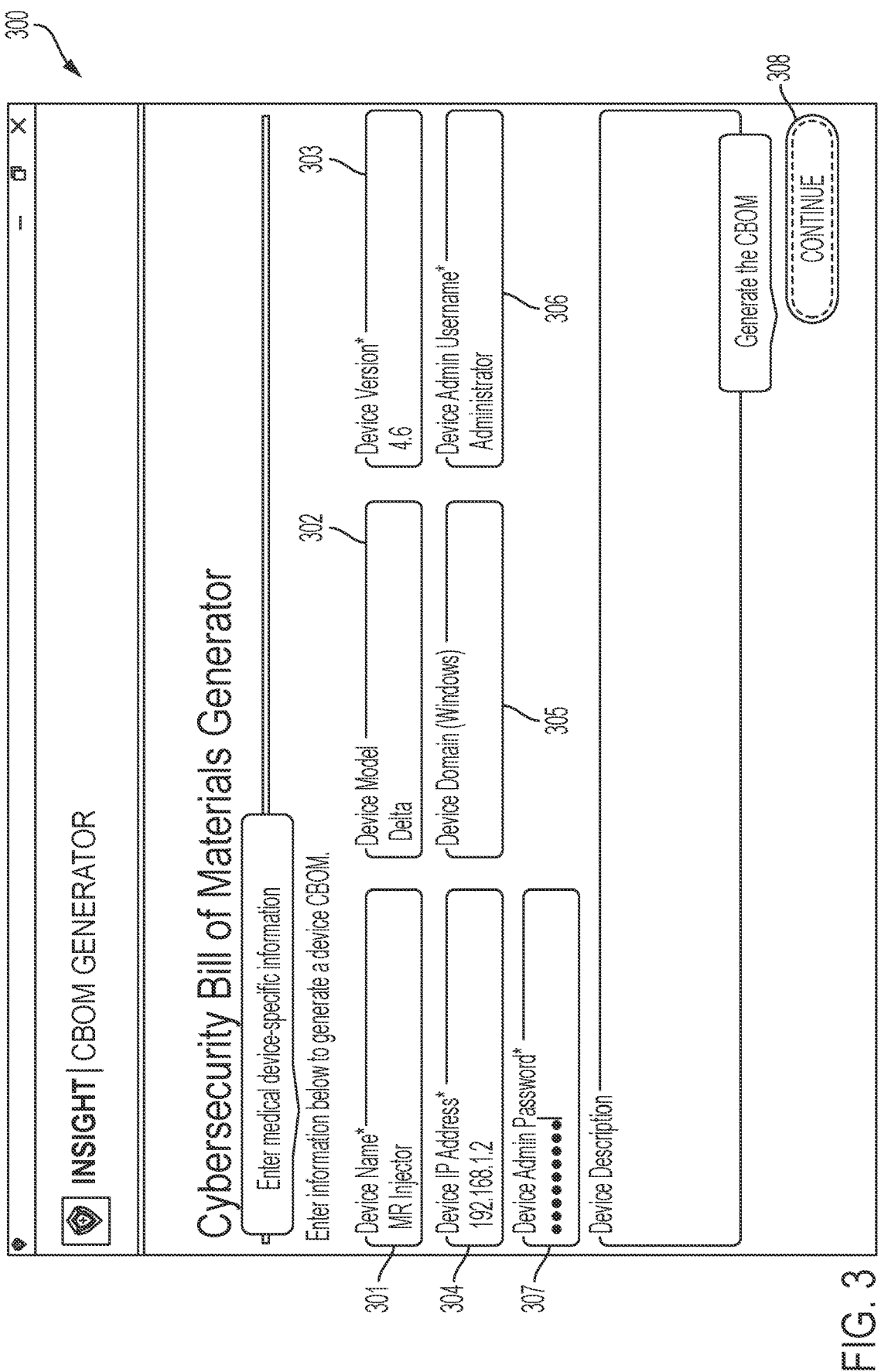
FIG. 3 depicts another illustrative graphical user interface for CBOM generation, in a medical device cybersecurity platform, according to an embodiment.

Referring now to FIG. 3, once the system has obtained the information associated with the medical device (e.g., autonomously or via direct user input), the system may display the information for review. At this point, the user may update/modify any of the characteristics (e.g., device name 301, device model 302, device version 303, IP address 304, device domain 305, device administrator 306, device password 307, and/or the like) using the CBOM generator GUI 300. Once the characteristics have been fully entered and/or verified the user may select "continue" 308 and/or the system may automatically proceed. In some embodiments, one or more of the characteristics may be required and/or mandatory for the system to proceed beyond this stage.

Referring now to FIG. 4, illustrative terminal text created during CBOM generation is shown. In some embodiments, and as shown, the system may collect information pertaining to each component and identify or determine a vendor, a product name, a version, and the like for one or more medical devices. It should be understood that FIG. 4 is merely illustrative, and thus, the listing of identified characteristics is intended to be non-limiting, and may include additional characteristics (e.g., purchase date, date of last update, date of last CBOM generation, date of most recent patch, information on associated or additional systems that are used by the medical device, etc.) used both now and in the future that relate to medical devices.

In some embodiments, once the CBOM has been created, the CBOM may automatically be incorporated into the platform. In some embodiments, it may be useful (particularly for a device manufacturer) to allow a user to manually select which CBOM(s) are uploaded and associated with a specific group or subset of devices. Thus, in some embodiments and as shown in FIG. 5, the system may allow a user to upload one or more specific CBOMs by selecting "UPLOAD CBOM" 501. In a further embodiment, the system may display identifying details of one or more device characteristics to allow for user verification and/or approval.

In some embodiments, the MDM may be the only entity capable of uploading a CBOM. An HDO may be able to communicate with the MDM, through the platform, to request an uploaded CBOM. In further embodiments, the HDO may request, from the MDM, the ability to generate the CBOM directly. In some embodiments, multiple CBOMs may be uploaded together. An HDO having the ability to upload CBOMs is particularly beneficial for the generation of SBOMs, wherein any one computing device may contain a large quantity of software products.

Figure 6:
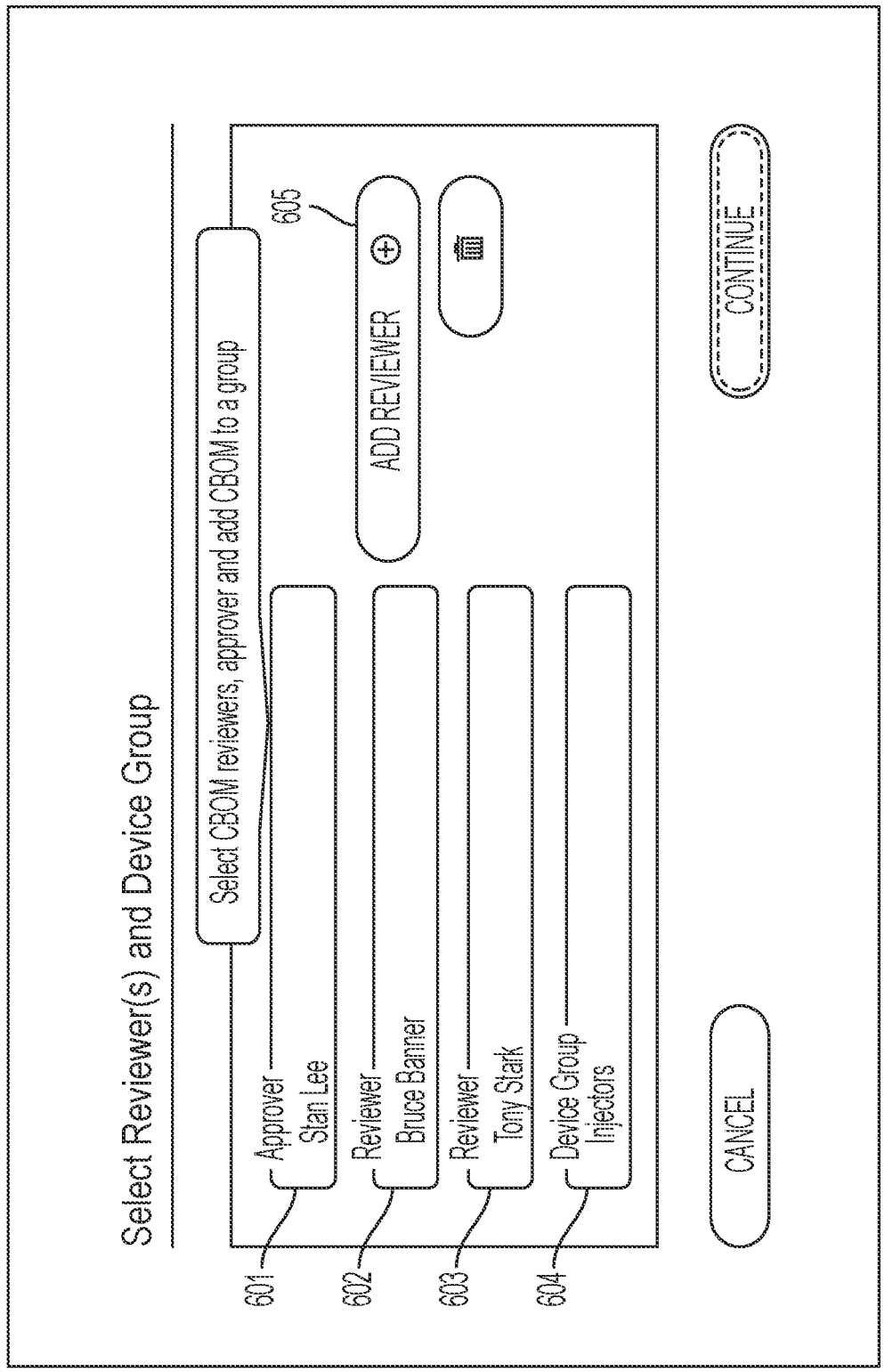
FIG. 6 depicts an illustrative graphical user interface for setting reviewers and a device group for a CBOM, in a medical device cybersecurity platform, according to an embodiment.

As would be understood by one of ordinary skill in the art, the collection and creation of the device characteristics recorded in the CBOM are of critical importance. Thus, in some embodiments, the system may allow for specific individuals (e.g., technical experts, subject matter experts, designers, quality control, etc.) to be assigned to review and/or approve a generated CBOM. Referring now to FIG. 6, in illustrative embodiment of a GUI as created by the system is shown in which an approver 601, a first reviewer 602, a second reviewer 603, and a device group 604 may be specified. In cases where the CBOM is overly complex or extremely long, the system may allow for multiple reviewers to be added using the "ADD REVIEWER" button 605. In a further embodiment (not shown), each reviewer may be assigned a specific category and/or subset of the CBOM to review. For example, it may be beneficial for a software designer or subject matter expert to review and confirm all of the software characteristics in the CBOM, while a hardware engineer or other subject matter expert reviews and confirms the various hardware components.

Figure 7:
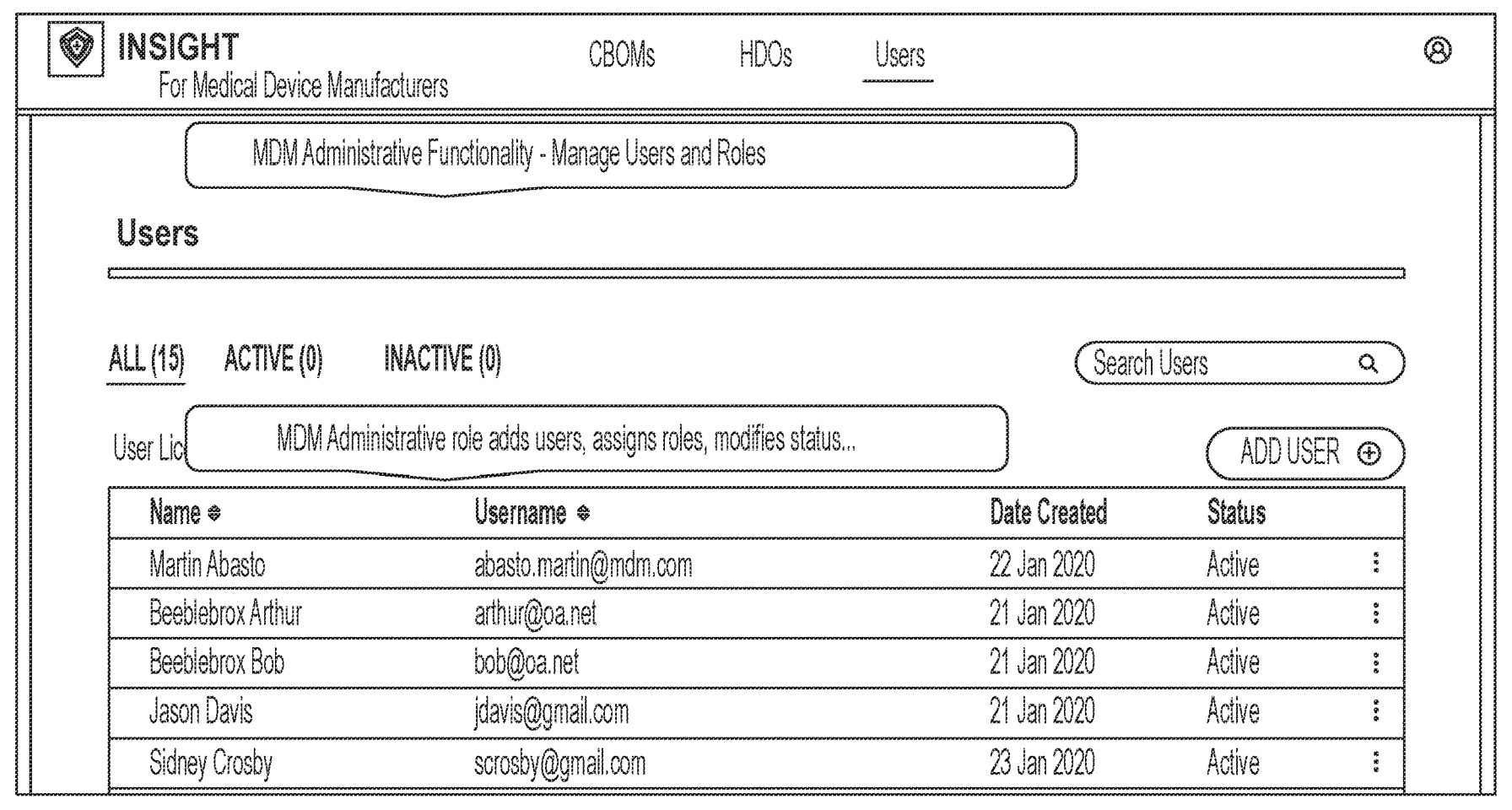

Referring now to FIG. 7, an illustrative example of a GUI is shown according to an embodiment in which an administrator (e.g., a MDM administrator, a HDO administrator, a platform administrator, etc.) may add users, remove users, assign user roles, modify user status, and/or the like. Thus, in a further embodiment, such as is shown in FIG. 8, the user may be presented with a GUI that allows changes to the user account (e.g., first name 801, last name 802, email 803, and privileges 804).

Figure 9:
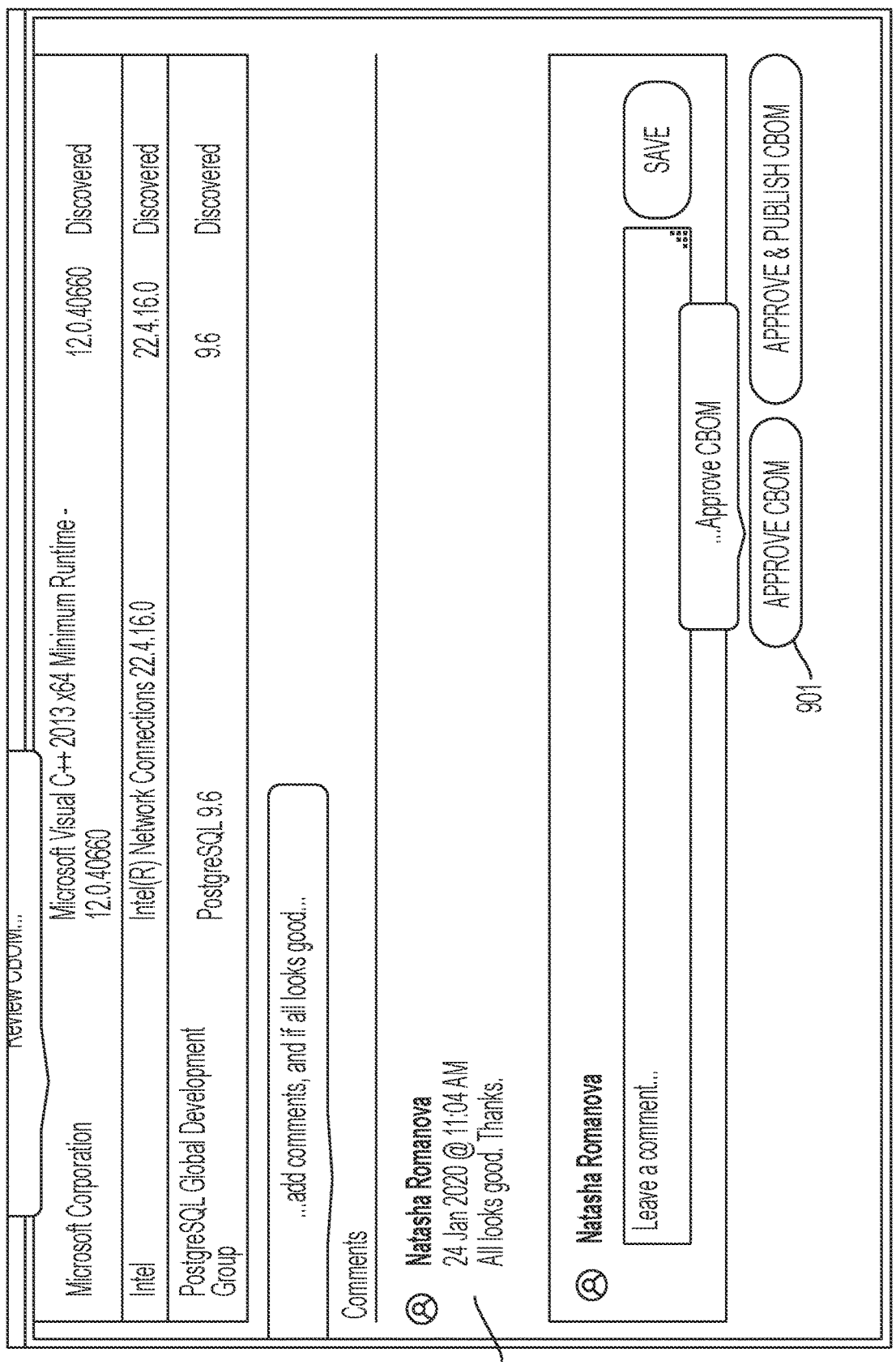
FIG. 9 depicts an illustrative graphical user interface for reviewing a CBOM, in a medical device cybersecurity platform, according to an embodiment.
Figure 10:
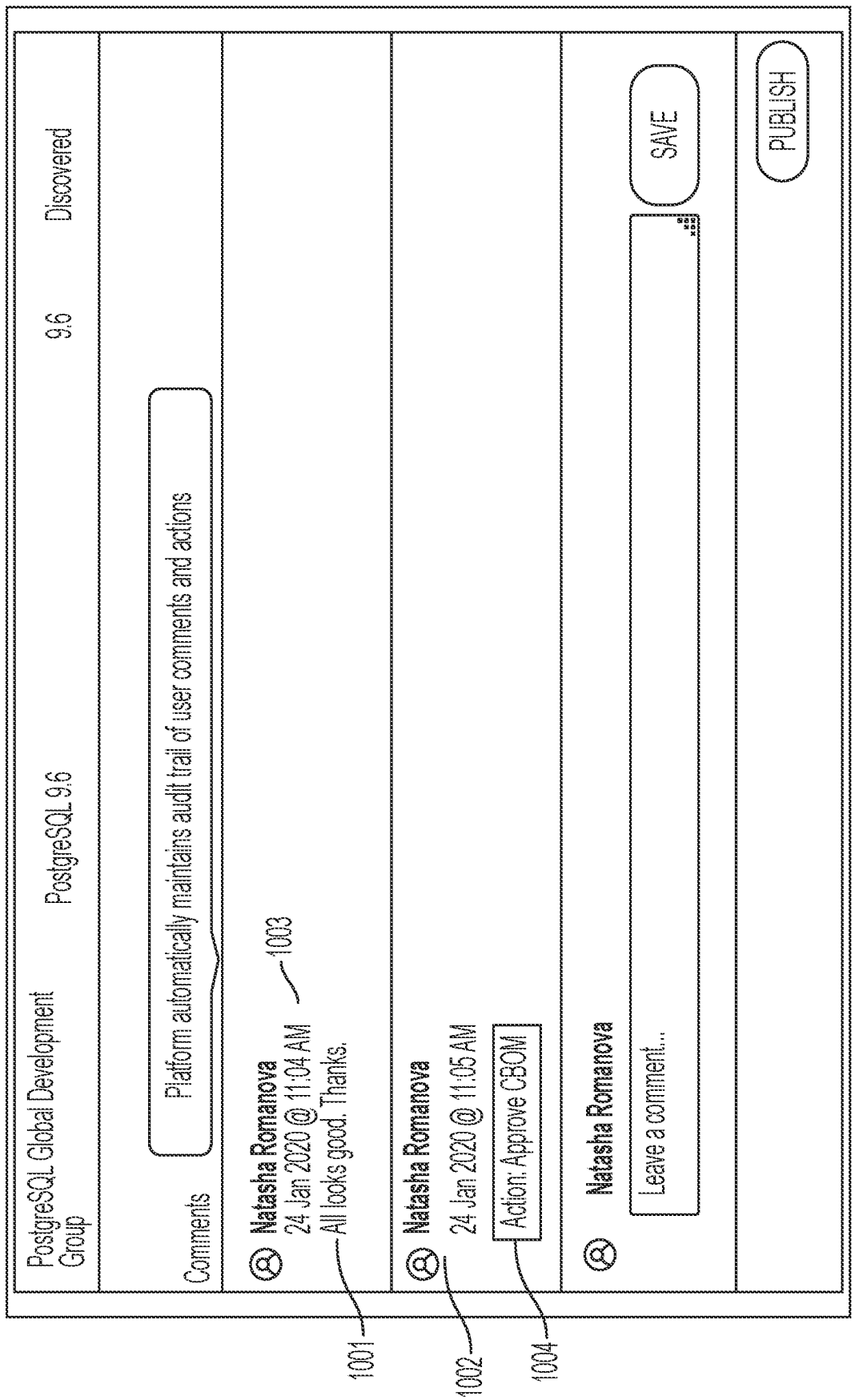
FIG. 10 depicts another illustrative graphical user interface for reviewing a CBOM, in a medical device cybersecurity platform, according to an embodiment.

In another embodiment, such as is shown in FIG. 9, after the tasks associated with a reviewer/approver are assigned, the system may allow various users (e.g., the assigned individual) to review their assigned portion and approve 901 and/or comment 902 on the status of the CBOM, or CBOM subset. In a further embodiment, such as is shown in FIG. 10, it may be beneficial for the system to track and record each time a user updates, approves, or modifies, the CBOM. Thus, the system may, in some embodiments, display to a user (e.g., administrator, reviewer, etc.) any comments 1001 left by the user 1002, a date and time 1003 of the action, and a description of the action 1004. It should be understood this is a non-limiting illustrative example, and that various other details, which are not shown, may be captured as well. For example, a device name/type, an identification of a subset of a CBOM that was reviewed and/or approved, a title and/or status of the user, including their IP, that is reviewing, modifying, and/or approving the CBOM, and/or any other useful information related to the CBOM or user.

Once the CBOM is finalized, the system may identify an evaluation equivalent to each item in the CBOM. As discussed herein, in some embodiments, during the creation of the CBOM, software and hardware products running on medical devices may be retrieved by the system, and a CBOM may be generated automatically. Once the CBOM has been finalized (e.g., by user review/approval, autonomously via the system, or by a secondary verification system such as an AI Neural Network), the software/hardware products may then be mapped to software/hardware products in a generic listing (e.g., the National Institute of Standards and Technology (NIST)'s Common Platform Enumeration (CPE) database) via a system algorithm.

In some embodiments, the matching algorithm may enable the system to match the characteristics of the medical device, such as, for example, vendor, product, version, architecture, operating system, or the like, with those in the CPE. In some embodiments, the matching algorithm may leverage a Levenshtein Distance algorithm, or a similar algorithm, to match the medical device characteristics in the CBOM with the characteristics listed in a CPE that are linguistically close.

In an additional or alternative embodiment, the matching algorithm may utilize full and/or partial string matching to determine accurate scores for products with similar names or descriptions. In a further embodiment, the system may use context clues or other known characteristics to make assumptions and/or determinations in an attempt to resolve an erroneous CPE match. For example, the matching algorithm may standardize different data formats (e.g., version, architecture, release dates, etc.) and use those standardized data formats to evaluate and/or determine a match with the CPE(s) even when existing CPE data is entered incorrectly or in a non-standard format.

In a further embodiment, the matching algorithm may allow for several customizations that can increase the size or accuracy of result sets, such as, for example, controlling outlier scoring limits, running multiple products in a batch, running multiple passes on a single product, and removing outlying scoring components (e.g., the vendor score) from the overall score. In another embodiment, the matching algorithm may include logic designed to ignore and/or correct inconsistencies related to extended data about a product that is contained in both the CPE and the product details.

For example, in some embodiments, there may be no standard definition for how the certain fields (e.g., Edition, Software Edition, Target Software, and Target Hardware, etc.) can or should be filled out. Thus, the system may need to consider information in those certain CPE fields as matching to one or more elements of the software fields. This is because, in some embodiments, the listing of components in the CPE are essentially free text fields. However, if the software edition, target software and/or target hardware are populated, the system may be able to determine the relevant product being represented. As an non-limiting example, consider the following component examples, "cpe:/a:apple:itunes:4.0.0:-:windows" and cpe:/a:centrify:authentication_service:3.4.1:~~~windows~~." In some embodiments, the system may identify that the same piece of information, i.e., "windows," occurs in a different field: edition and software_edition, respectively.

In a further embodiment, once the CBOM has been updated and/or modified to conform to the desired CPE, the system may map the CPE(s) to Common Vulnerabilities and Exposures (CVEs). As discussed herein, various vulnerability databases exist (e.g., the NIST database) that monitor and record software vulnerabilities identified as CVEs. Thus, in some embodiments, software product vulnerabilities can be found by matching a software product's CPE to one or more CPE(s) that are impacted by a CVE.

In some instances, matching one or more CPEs and one or more CVEs is heavily dependent on matching software and/or hardware versions. Thus, in some embodiments, one or more CVEs may be able to provide one or more CPEs with an exact version or a range of versions from which a selection may be made. The system may also utilize a proprietary range matching algorithm that can account for variations in versions.

In some embodiments, the system may determine that the CVE database has one or more CPEs that are not present in a vulnerability database (e.g., NIST's CPE database). When discovered, the system may add the one or more new CPEs to its CPE database, thereby improving the comprehensive list of CPEs based on the vulnerability database.

Referring now to FIG. 11, an example GUI is shown according to an embodiment. As shown, the GUI may present a listing of devices 1110 and/or a listing of components 1120 to a user. In a further embodiment, the system may include various details. For example, in the listing of devices 1110, the system may provide a device name 1111, a model 1112, a version 1113, a received date 1114, a manufacturer 1115, a total number of associated components 1116, a percentage of the components that have been reviewed 1117, and a status 1118. In another embodiment, the CPE listing 1120 for a component may provide a vendor name 1121, a product description 1122, a version 1123, a date on which the CPE was last reviewed 1124, a total number of CBOMs 1125, and a current match 1126 (i.e., an evaluation equivalent).

In some embodiments, a user may select a specific device 1101 or CPE to review and/or modify, such as by using the GUI shown in FIG. 11. In some embodiments, the system may select the device or CPE autonomously based on one or more factors (e.g., an automatic ranking system, a user preference, an administrator's assigned order, a user-weighted ranking system, etc.).

Figure 12:
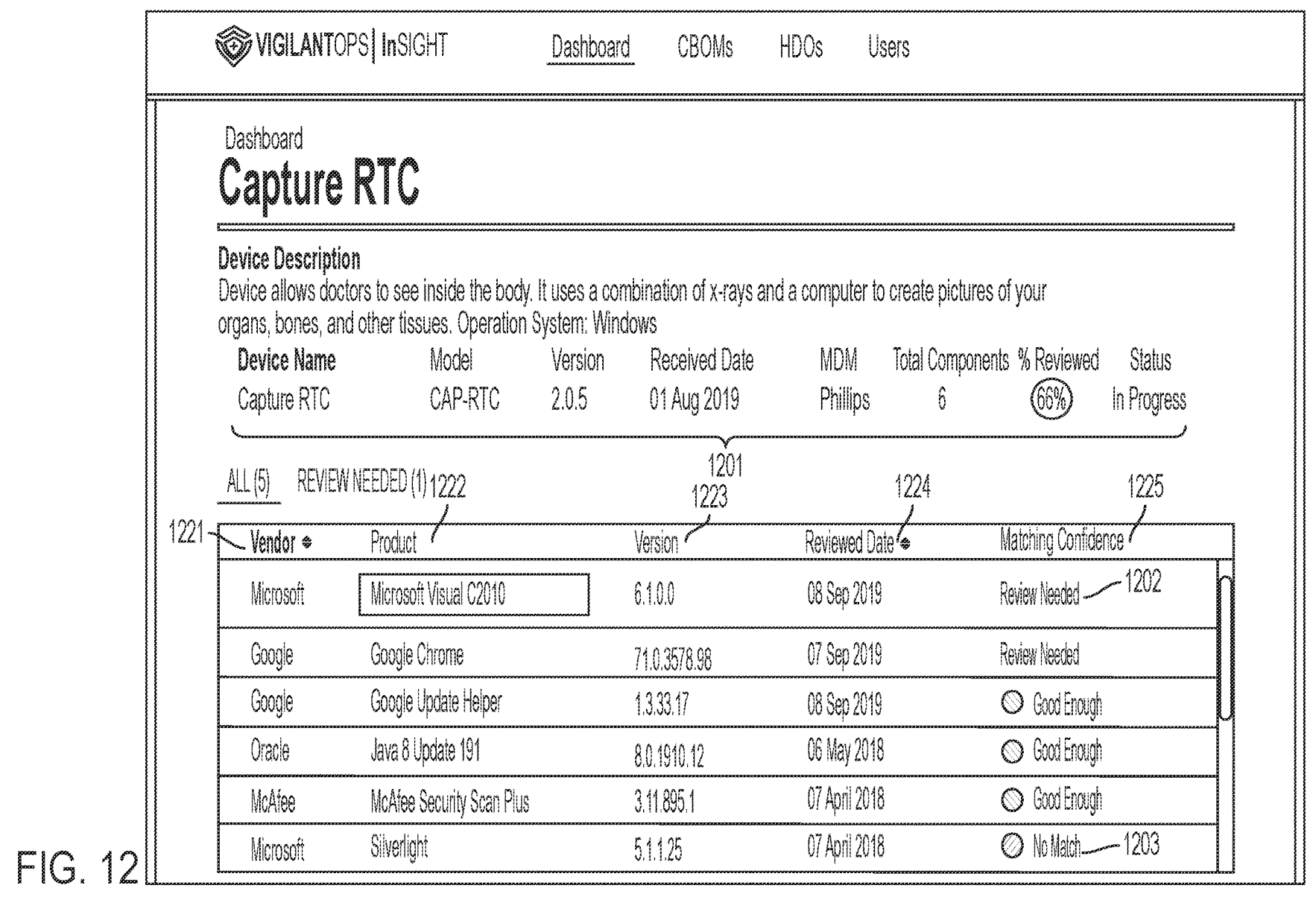

By way of non-limiting example, if a user were to select a device, such as Capture RTC 1101, the system may generate and display a different GUI such as the one shown in FIG. 12. In some embodiments, and as shown, the system may continue to display one or more of the provided details 1201 (e.g., device name, model, version, received date, manufacturer, total associated components, percent reviewed, and status). In addition, the system may, according to some embodiments, display the associated CPE data related to the selected device 1101 (e.g., a vendor name 1221, a product description 1222, a version 1223, a date on which the CPE was last reviewed 1224, and a current match 1225). As shown, in some embodiments, the system may rank the CPE(s) based on one or more factors (e.g., vendor, product, version, review date, or, as shown, matching confidence). In some embodiments, the system may be unable to find a match that is adequate or "good enough." In such an embodiment, the system may request a user to review a best match 1202. In the cases where no potential matches are found, the system may represent the lack of a match with text and or color (e.g., "no match" and/or a red indicator) 1203.

By way of non-limiting example, if a user selects a particular CPE that has at least one match (e.g., selecting "Microsoft Visual c2010" 1202), the system may present a GUI, such as the GUI shown in FIG. 13, to a user. As shown, the system may display a ranked or unranked listing of potential matches 1330 to the user. A user may select an appropriate match 1331 for the outstanding CPE. In a further embodiment, the user may assign a match confidence level, which could be represented as a numerical figure (e.g., a confidence level from 1 to 10), or a text identifier (e.g., "Certified Match" vs. "Good Enough Match" 1332). The system may record the user-identified match and rely on the matched item for subsequent CPE matching queries. Thus, the system as described herein, when developed over multiple search iterations, expands/builds a more accurate repository of data from which to draw when making matching decisions.

In some embodiments, the system may not present any correct matches. In some embodiments, a lack of correct matches may occur because no correct matches exist in the matching database. In some embodiments, a lack of correct matches may result if the original CBOM contains erroneous information. In an embodiment in which a user is unable to find a match, the user may select a 'no existing matches' option (e.g., "NO CPE MATCH" 1333). In a further embodiment, the user may perform a manual search (e.g., a text-based search) for a potential match in other CPE databases and/or vulnerability databases. If a match is found via manual searching, the match may be saved to the database as discussed above to expand and/or build a more accurate repository of data from which to draw when making subsequent matching decisions.

In some embodiments, certifying the match may further comprise evaluating the CBOM and providing a relative risk profile score that is calculated based on multiple variables comprising: the number of components, the number of vulnerabilities, the severity of vulnerabilities, which may be based on a standard scoring like the Common Vulnerability Scoring System (CVSS), and the number of components lacking CPE matches.

In some embodiments, the CBOM risk profile score is provided to the MDM. Underlying variables which contributed to the risk profile score may also be provided, enabling the MDM to take corrective action to raise their risk profile score. For example, if a software component has multiple critical vulnerabilities, that impacts its risk profile score in a negative way, a recommendation for upgrading/patching that component in order to obtain a better risk profile score may be provided. In further embodiments, a CBOM risk profile score may be used by the MDM to advertise the security of their products.

In some embodiments, HDOs may receive one or more CBOM risk profile scores associated with one or more product types to assist in product evaluations.

Figure 14:
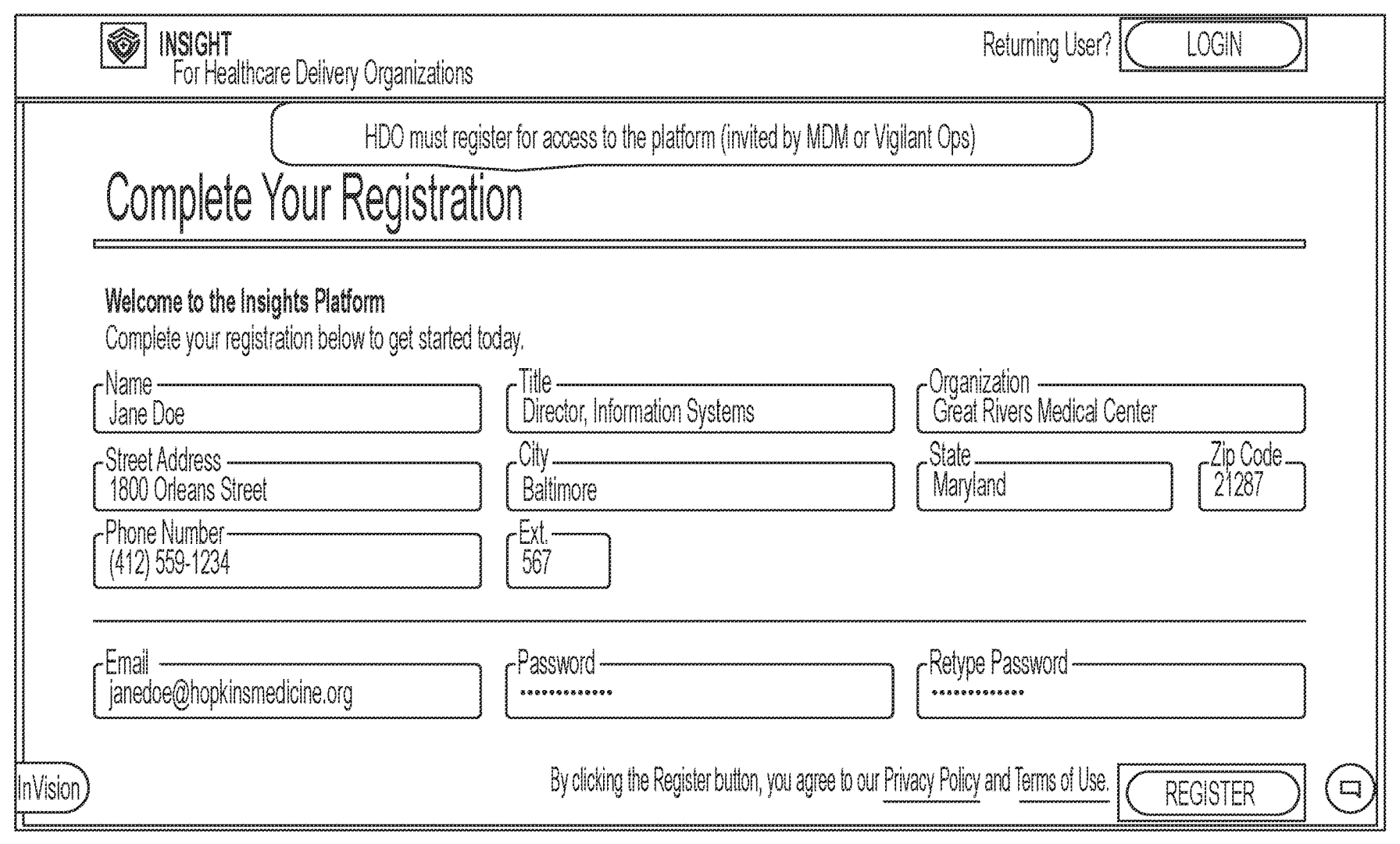
Figure 15:
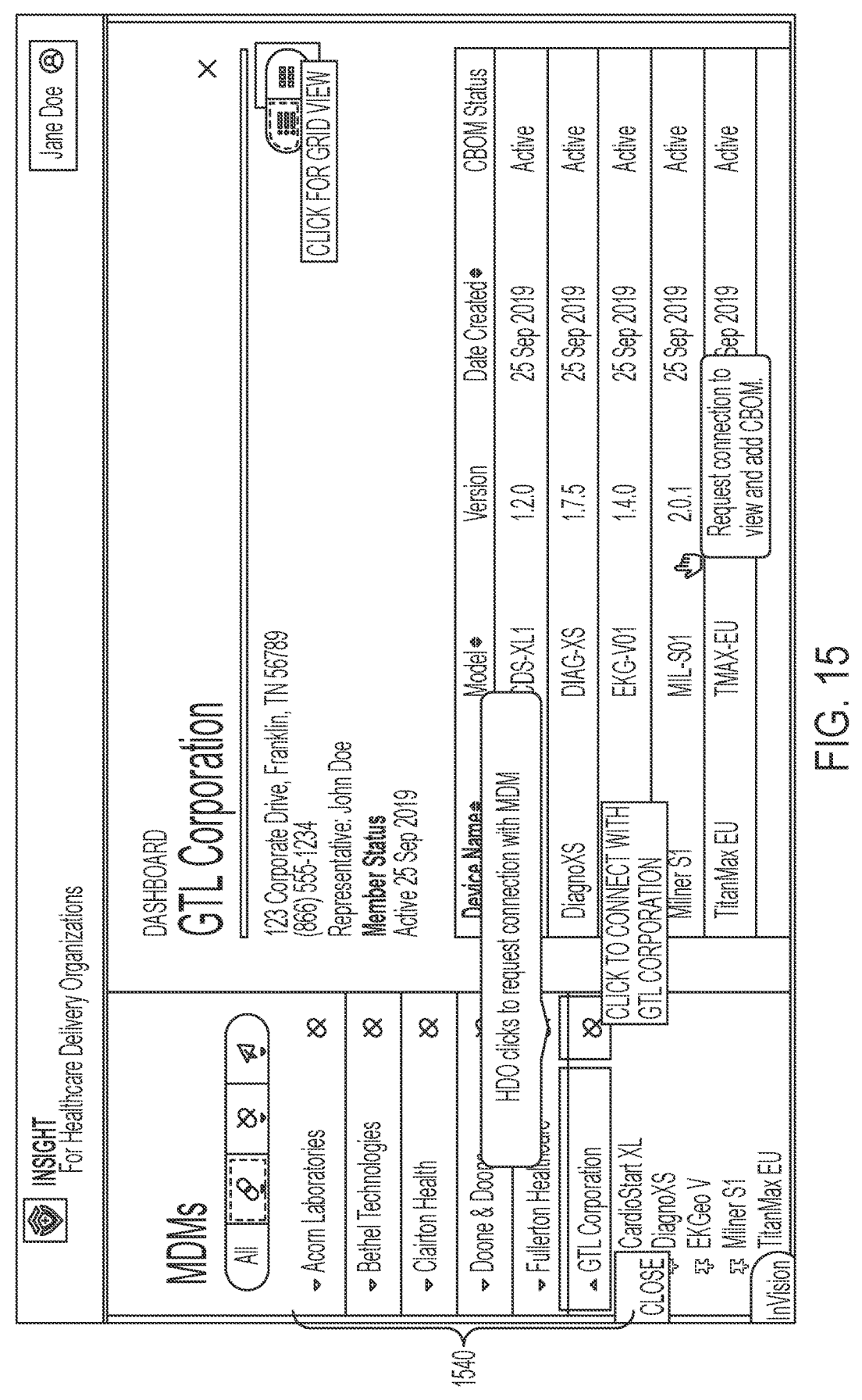

In some embodiments, and as discussed herein, HDOs may utilize the platform to monitor one or more medical devices used for patient care. As shown in FIG. 14, a user can create a profile or otherwise register with the system. The registration process may, in some embodiments, include an identification of a medical organization with which the user is associated (e.g., the Great Rivers Medical Center). Once the user is registered and granted privileges by an administrator (if required), a user may access a portal interface, such as the one shown in FIG. 15. In some embodiments, and as shown, a user may be able to view a listing of MDM(s) 1540 associated with various medical devices, such as medical devices that are used within the user's organization. In some embodiments, a user, HDO, or administrator may make a request to connect to one or more MDM(s) before being provided with access to materials associated with the one or more MDM(s). The request may be, but is not limited to, an automated approval process, a human interview process, or some combination thereof. The request may require authentication based on an existing user account with an MDM and/or entry of a serial/identification number from a specific medical device product.

Figure 16:
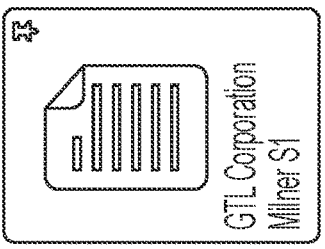
FIG. 16 depicts an illustrative graphical user interface for displaying CBOMs, in medical device cybersecurity platform, according to an embodiment.

Once the request is approved, the user may gain access to one or more existing CBOMs associated with the MDM(s) and their manufactured devices. In some embodiments, the system may only allow a user to access CBOMs associated with medical devices that the user, HDO, or administrator has purchased and/or are currently used by the user's organization. As shown in FIG. 16, a GUI may display a listing of CBOM(s) associated with a selected MDM (e.g., GTL Corporation) to a user. In a further embodiment, the CBOM(s) may include details associated with a product (e.g., Device Name, Model Number, Version, Date Created, and CBOM status), such as is shown in FIG. 17.

Figure 18:
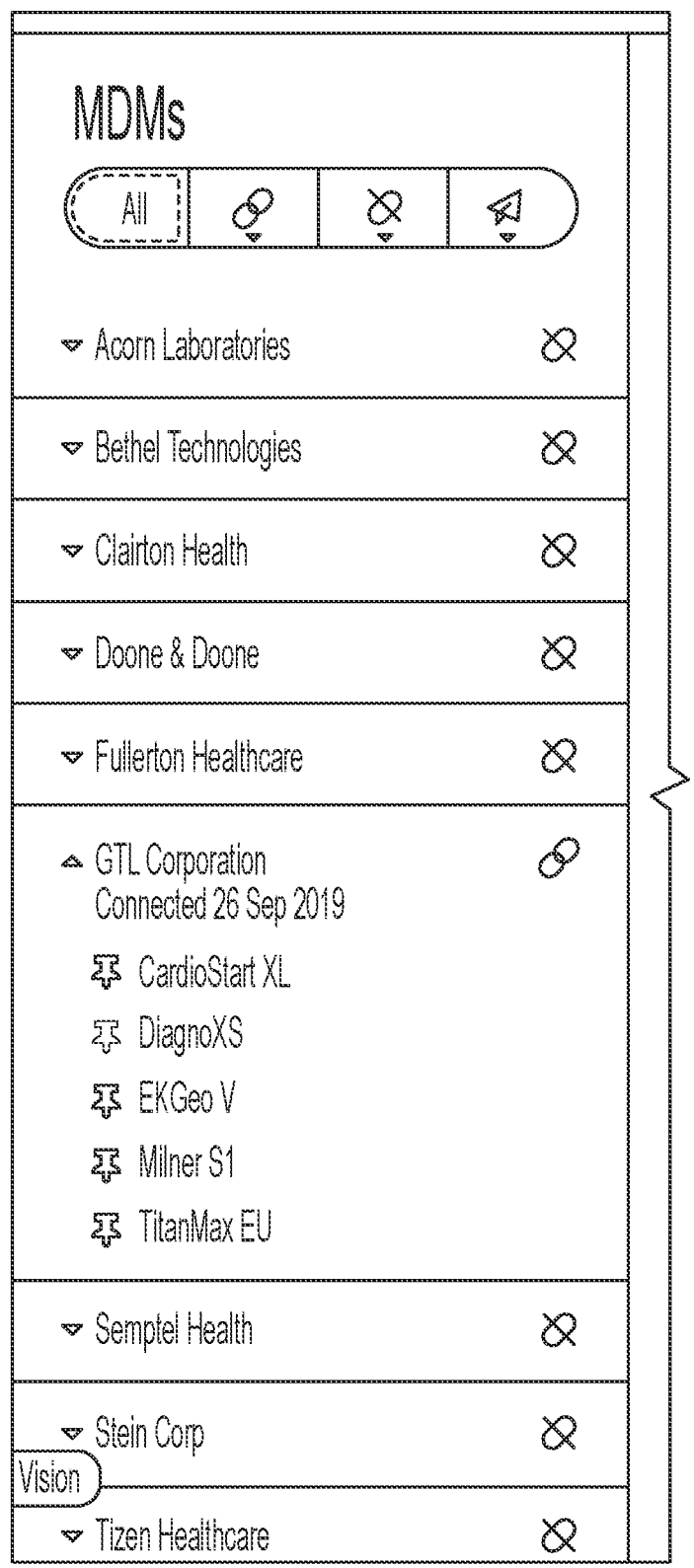
FIG. 18 depicts another illustrative graphical user interface dashboard view of a CBOM, in a medical device cybersecurity platform, according to an embodiment.
Figure 18:
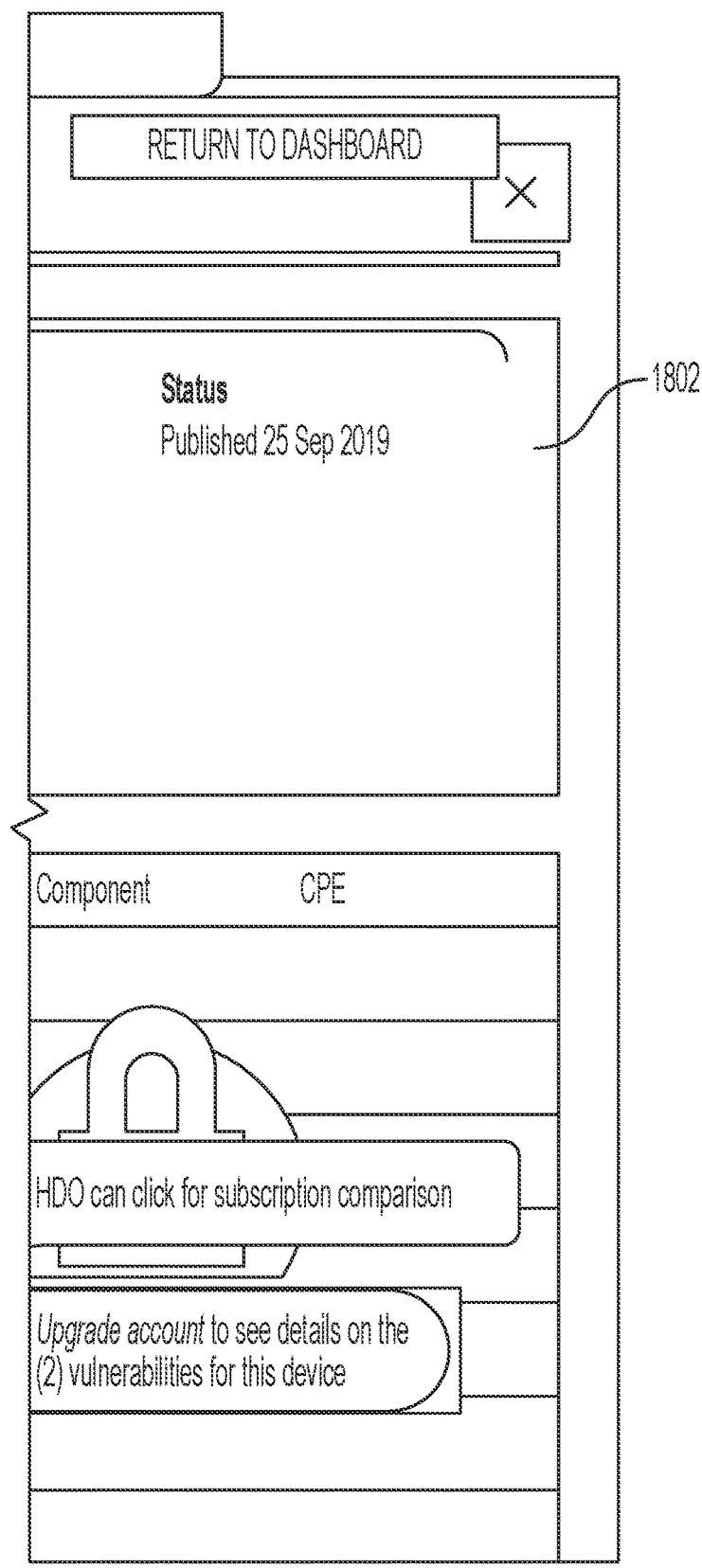

Once a particular device is selected, the user may review the entire CBOM or a subset of the CBOM. As shown in FIG. 18, a GUI focused on the selected device may be generated. The GUI may include various details 1801 about the device (e.g., name, model, version, status, and publication date). In addition, the MDM (or a third party) may have included a device description 1802, which contains further details for the user's benefit. Additionally, in some embodiments, the user may select a component of the device (e.g., a software component of the device) for closer review. Referring now to FIG. 19, an example embodiment is shown in which a user has selected Microsoft Silverlight 1901 and received additional details regarding a potential vulnerability 1902. In a further embodiment, the system may offer an additional link for a more detailed view of the CBOM 1903. In an alternative embodiment, the system may not have additional details related to the potential vulnerability 1902, and thus would not offer an additional link. It should be understood that these are merely illustrative in nature and that no vulnerability may have been identified in some embodiments. As such, no additional details or link may be provided in such embodiments.

Figure 20:
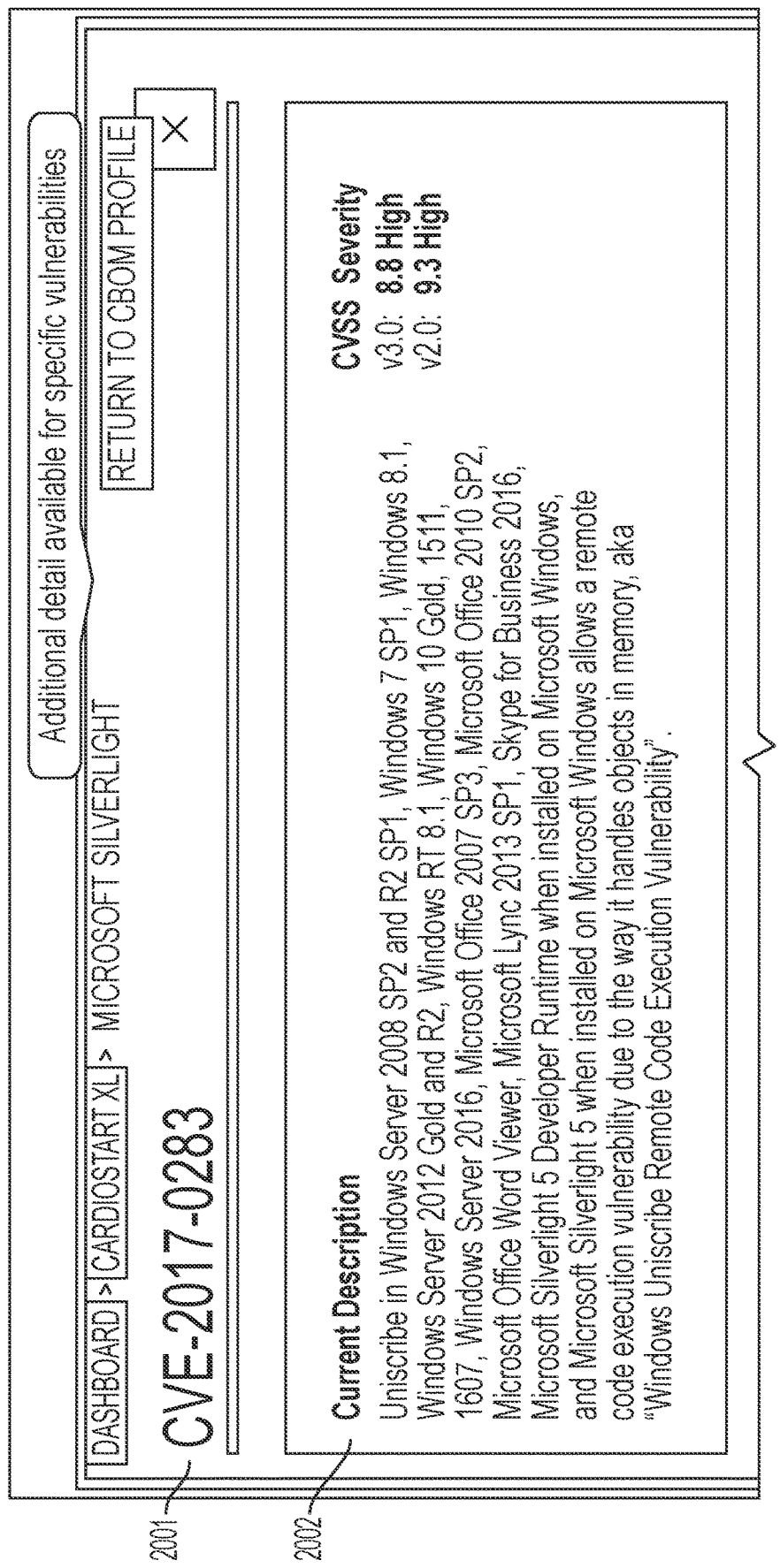
FIG. 20 depicts an illustrative graphical user interface providing an HDO view of a CBOM, in a medical device cybersecurity platform, according to an embodiment.
Figure 20:
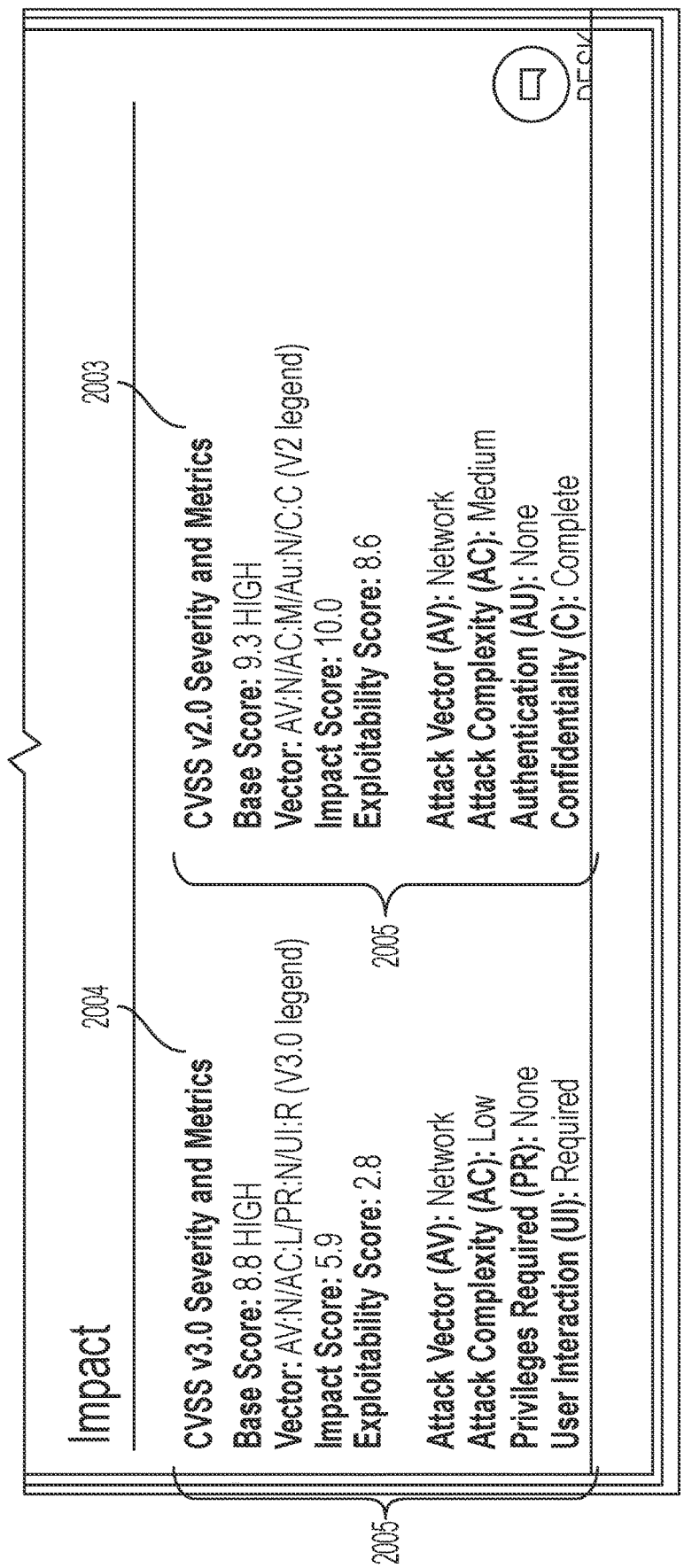

If a user selects the more detailed CBOM view option 1903, additional details may be provided in a GUI, such as is shown in FIG. 20. In some embodiments, and as shown, the GUI may include the specific CVE identification 2001, the full description of the vulnerability 2002, a CVSS score for both v2.0 2003 and v3.0 2004, as well as additional details associated with each 2005 (e.g., a base score, a vector, an impact score, an exploitability score, an attack vector, an attack complexity, a list of privileges required, a user interaction, an authentication, confidentiality, etc.).

Although CVSS is an open industry standard for assessing the severity of computer system security vulnerabilities, it should be understood that the various embodiments described herein are for illustrative purposes and are not intended to be limiting. Thus, in some embodiments, the system may offer alternative scoring metrics, such as Damage, Reproducibility, Exploitability, Affected users, Discoverability (DREAD); Spoofing, Tampering, Repudiation, Information disclosure, Denial of service, Elevation of privilege (STRIDE); or the like. It should further be understood, that although FIG. 20 illustrates v2.0 and v3.0, alternative versions of any tool for assessing the severity of computer system security may be used (e.g., CVSS 3.1, etc.).

As discussed herein, various parties may have access to the platform (101 in FIG. 1), such as an MDM, a HDO, a platform administrator, and/or one or more third parties. As discussed herein, various levels of access may be associated with each user who has access to the platform. Moreover, some features of the platform may be designed and/or implemented as a premium or subscription service. In a non-limiting example, the pop-ups 1903 shown in FIG. 19 may only be present for premium or subscription users.

In some embodiments, the platform may allow for various parties to communicate and/or transfer data securely with other parties. For example, in some embodiments, an HDO may be able to directly contact a MDM to request one or more patches or updates. In another embodiment, it may be possible for the MDM to actively "push" patches out to the medical devices in use in the field. In a further embodiment, the HDO may have to manually accept the patch (e.g., via accepting a notification, clicking a hyperlink, etc.) before the patch can be "pushed" out. It may also be possible, in some embodiments, for a user to allow the MDM to only "push" patches to certain devices, only push patches for a particular period of time, or only push patches until some future time. In some embodiments, a patch may be automatically "pushed" whenever there is an update. In some embodiments, a patch may be automatically "pushed" only when the update corrects an identified vulnerability. In some embodiments, patches may only be applied to devices/software with SBOMs that match a patch SBOM profile. In some embodiments, the platform may act as an intermediary by receiving one or more patches from an MDM and "pushing" the one or more patches out to the medical devices. In some embodiments, a patch may only be "pushed" after a time delay or at a scheduled maintenance time. Those of ordinary skill in the art will be aware of other limitations that a user may place on an MDM pushing patches, which are intended to be encompassed within the scope of this disclosure.

In some embodiments, the platform may provide prices and a check-out process for various services (e.g., through an MDM's service department or a third party technician). For example, it may be possible for one or more cybersecurity companies to provide the platform with a standard pricing list for various tasks, which the platform can then provide to an HDO, or other user, for purchase. In a further embodiment, the platform may be able to schedule an appointment via an electronic calendar with one or more service technicians.

Notifications relating to matches, vulnerabilities, patches, and available technical services may be annunciated to the user in a variety of formats. In some embodiments, a specific interface may log all notifications. In some embodiments, notifications may be displayed on a CBOM GUI similar to those depicted in FIGS. 16-17. In some embodiments, notifications may be annunciated to the user in multiple ways, including visual and auditory means. An entry with an associated notification may be highlighted or flagged. In further embodiments, notifications of certain types may be provided directly to one or more designated users through an automated email, text, call, or messaging application. In some embodiments, the notification may be sent to a service ticket system. In some embodiments, users receiving direct notifications may need to authenticate themselves prior to receiving or being redirected to the full notification.

Figure 21:
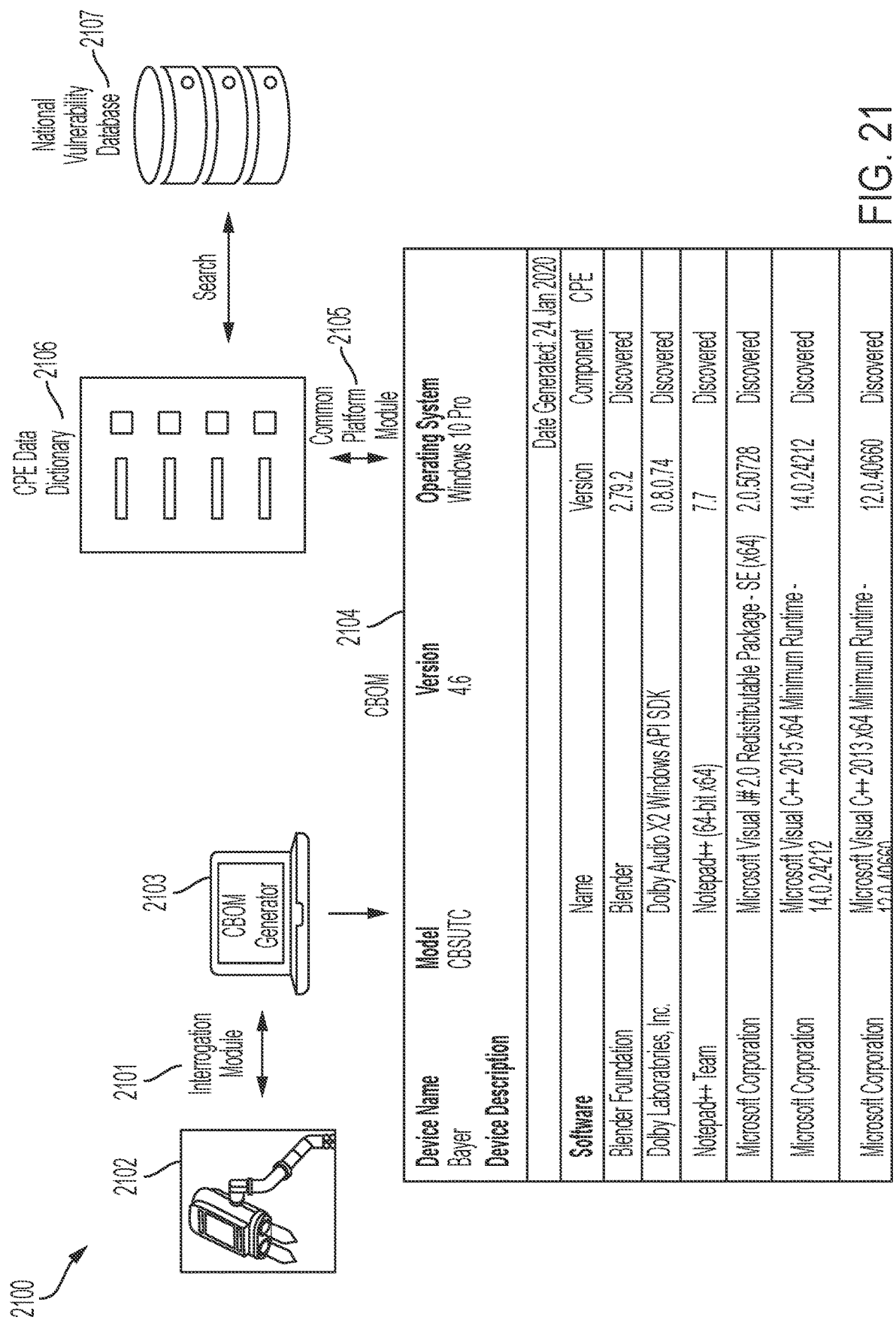
FIG. 21 depicts a medical device cybersecurity platform according to an embodiment.

Referring now to FIG. 21, various embodiments are discussed herein related to systems and/or methods for management of cybersecurity risks for medical devices. As discussed herein, the system 2100 may use an interrogation module 2101 to obtain various details about a medical device 2102. Once gathered, a CBOM generator 2103 may be used to create a cybersecurity bill of materials (CBOM) 2104. As discussed herein, the CBOM may include information and/or characteristics associated with a medical device; however, those details may not be accurate or in a universal format.

Thus, in an embodiment, the system 2100 may further use a common platform module 2105 to identify an evaluation equivalent for each of the plurality of characteristics based on a common platform enumeration data dictionary 2106. The evaluation equivalent may be, for example, a name of a piece of hardware/software, a version number, an operating system, a device name, MDM information, or any other information relevant to a medical device. As discussed herein, various embodiments may exist in which the evaluation equivalent may include a request for further information and/or user input (i.e., to assist and/or enable the CBOM to be properly created with a common platform enumeration (CPE)).

In some embodiments, the system may use the evaluation equivalent to determine whether the information and/or characteristics are associated with a vulnerability by comparing the CPE with the National Vulnerability Database (NVD) 2107 or an equivalent database. The system 2100 may also store the CBOM and vulnerability statistics and allow an authorized user(s) to review or access them via a maintenance platform.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++, C #, HTML, Angular, SQL, PostgreSQL, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (e.g., through the Internet using an Internet Service Provider).

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions or acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which are executed on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 22:
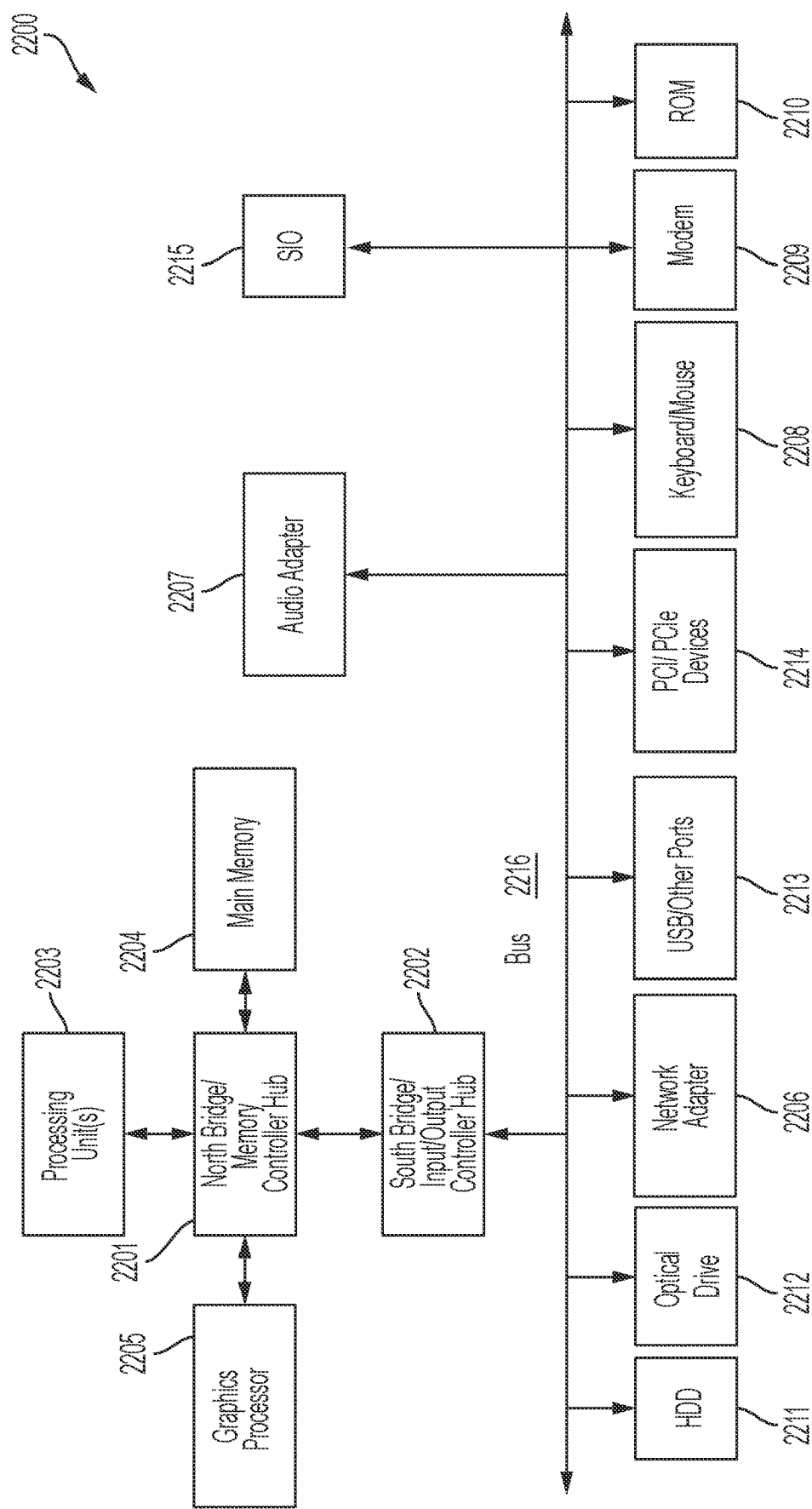
FIG. 22 depicts an illustrative computer system for a medical device cybersecurity platform according to an embodiment.

FIG. 22 is a block diagram of an example data processing system 2200 in which aspects of the illustrative embodiments are implemented. Data processing system 2200 is an example of a computer, such as a server or client, in which computer usable code or instructions implementing the process for illustrative embodiments of the present invention are located. In one embodiment, FIG. 22 may represent a server computing device, or cloud computing system, such as, for example, Amazon Web Services, Microsoft Azure, Google Cloud, Alibaba Cloud, Oracle Cloud, IBM Cloud, etc. In another embodiment, FIG. 22 may represent a client device, such as, for example, a personal computer, a table, smartphone, or any current or future electronic device capable of carrying out the embodiments disclosed herein.

In the depicted example, data processing system 2200 can employ a hub architecture including a north bridge and memory controller hub (NB/MCH) 2201 and south bridge and input/output (I/O) controller hub (SB/ICH) 2202. Processing unit 2203, main memory 2204, and graphics processor 2205 can be connected to the NB/MCH 2201. Graphics processor 2205 can be connected to the NB/MCH 2201 through, for example, an accelerated graphics port (AGP).

In the depicted example, a network adapter 2206 connects to the SB/ICH 2202. An audio adapter 2207, keyboard and mouse adapter 2208, modem 2209, read only memory (ROM) 2210, hard disk drive (HDD) 2211, optical drive (e.g., CD or DVD) 2212, universal serial bus (USB) ports and other communication ports 2213, and PCI/PCIe devices 2214 may connect to the SB/ICH 2202 through bus system 2216. PCI/PCIe devices 2214 may include Ethernet adapters, graphics processors 2205, add-in cards, and PC cards for notebook computers. ROM 2210 may be, for example, a flash basic input/output system (BIOS). The HDD 2211 and optical drive 2212 can use an integrated drive electronics (IDE) or serial advanced technology attachment (SATA) interface. A super I/O (SIO) device 2215 can be connected to the SB/ICH 2202.

An operating system can run on processing unit 2203. The operating system can coordinate and provide control of various components within the data processing system 2200. As a client, the operating system can be a commercially available operating system. An object-oriented programming system, such as the Java™ programming system, may run in conjunction with the operating system and provide calls to the operating system from the object-oriented programs or applications executing on the data processing system 2200. As a server, the data processing system 2200 can be an IBM® eServer™ System P® running the Advanced Interactive Executive operating system or the Linux operating system. The data processing system 2200 can be a symmetric multiprocessor (SMP) system that can include a plurality of processors in the processing unit 2203. Alternatively, a single processor system may be employed.

Instructions for the operating system, the object-oriented programming system, and applications or programs are located on storage devices, such as the HDD 2211, and are loaded into the main memory 2204 for execution by the processing unit 2203. The processes for embodiments described herein can be performed by the processing unit 2203 using computer usable program code, which can be located in a memory such as, for example, main memory 2204, ROM 2210, or in one or more peripheral devices.

A bus system 2216 can be comprised of one or more busses. The bus system 2216 can be implemented using any type of communication fabric or architecture that can provide for a transfer of data between different components or devices attached to the fabric or architecture. A communication unit such as the modem 2209 or the network adapter 2206 can include one or more devices that can be used to transmit and receive data.

Those of ordinary skill in the art will appreciate that the hardware depicted in FIG. 22 may vary depending on the implementation. Other internal hardware or peripheral devices, such as flash memory, equivalent non-volatile memory, or optical disk drives may be used in addition to or in place of the hardware depicted. Moreover, the data processing system 2200 can take the form of any of a number of different data processing systems, including but not limited to, client computing devices, server computing devices, tablet computers, laptop computers, telephone or other communication devices, personal digital assistants, and the like. Essentially, data processing system 2200 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Those skilled in the art may implement modifications to the current design, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as they fall within the true spirit and scope of the invention.

What is claimed is:

1. A system for the management of cybersecurity risks for medical devices, the system comprising:
a processor; and
a non-transitory, processor-readable storage medium, wherein the non-transitory, processor-readable storage medium comprises one or more programming instructions that, when executed, cause the processor to:
receive data associated with a medical device;
evaluate, based on the data, an identity of the medical device;
generate, based on the identification, a cybersecurity bill of materials associated with the medical device, wherein the cybersecurity bill of materials comprises a software bill of materials detailing a software component of the medical device, wherein the software bill of materials comprises a build status comprising a build environment of the software component and a current status comprising applied updates to the software component;
standardize the cybersecurity bill of materials based on a common platform enumeration database;
evaluate, using a vulnerability database, the cybersecurity bill of materials to identify one or more potential vulnerabilities;
provide notification of the one or more potential vulnerabilities to at least one user;
determine, using a manufacturer's database, whether the medical device is up-to-date; and
responsive to determining that the device is not up-to-date, receive a patch from the manufacturer's database to update the medical device.

2. The system of claim 1, wherein the received data associated with the medical device comprises at least one of a device manufacturer, a device name, a device model, a device version, an IP address, a device domain, a device administrator, or a device password.

3. The system of claim 1, wherein the one or more programming instructions that, when executed, cause the processor to receive data associated with the medical device further comprise one or more programming instructions that, when executed, cause the processor to interrogate the medical device directly for data.

4. The system of claim 1, wherein the data associated with the medical device is received directly from the medical device.

5. The system of claim 1, wherein the data associated with the medical device is received directly from the build environment of the software.

6. The system of claim 1, wherein the at least one user comprises at least one of a medical device manufacturer user, a healthcare delivery organization user, or a platform maintenance user.

7. The system of claim 1, wherein the one or more programming instructions that, when executed, cause the processor to evaluate, using a vulnerability database, the cybersecurity bill of materials to identify one or more potential vulnerabilities are performed recursively and in real-time.

8. The system of claim 1, wherein the one or more programming instructions that, when executed, cause the processor to provide notification of the one or more potential vulnerabilities further comprise one or more programming instructions that, when executed, cause the processor to flag the one or more potential vulnerabilities on a graphical user interface.

9. The system of claim 1, wherein the one or more programming instructions that, when executed, cause the processor to provide notification of the one or more potential vulnerabilities further comprise one or more programming instructions that, when executed, cause the processor to message at least one user using an automated email, text, call, messaging application, or service ticket system.

10. The system claim 1, wherein the one or more programming instructions that, when executed, cause the processor to evaluate the identity of the medical device further comprise one or more programming instructions that, when executed, cause the processor to map the identity of the device to a standard naming convention of a known device.

11. The system of claim 1, further comprising one or more programming instructions that, when executed, cause the processor to automatically deploy the received patch.

12. The system of claim 1, further comprising one or more programming instructions that, when executed, cause the processor to:
transmit a notification associated with the received patch to at least one user;
receive deployment instructions to deploy the received patch from the at least one user; and
deploy the received patch in response to receiving the deployment instructions.

13. The system of claim 11, wherein the one or more programming instructions that, when executed, cause the processor to deploy the received patch further comprise one or more programming instructions that, when executed, cause the processor to deploy the received patch at a pre-determined time.

14. A method for the management of cybersecurity risks for medical devices, the method comprising:
receiving data associated with a medical device;
evaluating, based on the data, an identity of the medical device;
generating, based on the identification, a cybersecurity bill of materials associated with the medical device, wherein the cybersecurity bill of materials comprises a software bill of materials detailing a software component of the medical device, wherein the software bill of materials comprises a build status comprising a build environment of the software component and a current status comprising applied updates to the software component;
standardizing the cybersecurity bill of materials based on a common platform enumeration database;
evaluating, using a vulnerability database, the cybersecurity bill of materials to identify one or more potential vulnerabilities;
providing notification of the one or more potential vulnerabilities to at least one user;
determine, using a manufacturer's database, whether the medical device is up-to-date; and
responsive to determining that the device is not up-to-date, receiving a patch from the manufacturer's database to update the medical device.

15. The method of claim 14, wherein receiving data associated with the medical device further comprises interrogating the medical device directly for data.

16. The method of claim 14, wherein providing notification of the one or more potential vulnerabilities further comprises flagging the one or more potential vulnerabilities on a graphical user interface.

17. The method of claim 14, wherein providing notification of the one or more potential vulnerabilities further comprises messaging at least one user using an automated email, text, call, messaging application, or service ticket system.

18. The method of claim 14, wherein evaluating the identity of the medical device further comprises mapping the identity of the device to a standard naming convention of a known device.

19. The method of claim 14, further comprising automatically deploying the received patch.

20. The method of claim 14, further comprising:
transmitting a notification associated with the received patch to at least one user;
receiving deployment instructions to deploy the received patch from the at least one user; and
deploying the received patch in response to receiving the deployment instructions.

* * * * *